United States Patent
Horsch

(10) Patent No.: US 9,591,798 B2
(45) Date of Patent: Mar. 14, 2017

(54) DISTRIBUTING UNIT FOR GRANULAR MATERIAL, IN PARTICULAR A SEEDING UNIT

(71) Applicant: Horsch Maschinen GmbH, Schwandorf (DE)

(72) Inventor: Thomas Horsch, Freiberg (DE)

(73) Assignee: HORSCH MASCHINEN GMBH, Schwandorf (DE)

( * ) Notice: Subject to any disclaimer, the term of this patent is extended or adjusted under 35 U.S.C. 154(b) by 105 days.

(21) Appl. No.: 14/407,401

(22) PCT Filed: Jun. 10, 2013

(86) PCT No.: PCT/EP2013/061896
§ 371 (c)(1),
(2) Date: Dec. 11, 2014

(87) PCT Pub. No.: WO2013/186161
PCT Pub. Date: Dec. 19, 2013

(65) Prior Publication Data
US 2015/0122162 A1    May 7, 2015

(30) Foreign Application Priority Data

Jun. 12, 2012 (DE) .......................... 10 2012 105 081

(51) Int. Cl.
*A01C 7/04* (2006.01)
*A01C 7/18* (2006.01)

(52) U.S. Cl.
CPC ................ *A01C 7/04* (2013.01); *A01C 7/042* (2013.01)

(58) Field of Classification Search
CPC ......... A01C 17/00; A01C 7/04; A01C 17/003; A01C 17/008; G01F 11/006; G01F 11/24; G01F 13/005

(Continued)

(56) References Cited

U.S. PATENT DOCUMENTS

| 767,762 A | * | 8/1904 | McClelland | ....... B65G 21/2081 198/525 |
| 1,553,539 A | * | 9/1925 | Kinyon | ..................... F23K 3/00 110/104 R |

(Continued)

FOREIGN PATENT DOCUMENTS

| CN | 100998281 A | 7/2007 |
| DE | 1027924 B | 4/1958 |

(Continued)

OTHER PUBLICATIONS

Written Opinion of the International Searching Authority, International application No. PCT/EP2013/061896 dated Dec. 12, 2014.

*Primary Examiner* — John G Weiss
(74) *Attorney, Agent, or Firm* — Erickson Kernell IP, LLC

(57) ABSTRACT

A distributing unit (10) for granular material such as seed grains (12), fertilizers or the like is disclosed, in particular a seeding unit (11) of a distributing or seeding machine. The unit (10) comprises a housing (14) with at least one inlet opening (18) for conveying granular material or conveyed seed grains (12) and an outlet opening (26) and also a rotating conveying device (24) with at least one rotating conveying element (28) for taking hold of the granular material or the seed grains (12), which conveying element is arranged or extends approximately axially with respect to the housing (14). The grains are held by centrifugal forces on an inner lateral surface region (16) of the housing (14), are crowded together there and are aligned with respect to one another and are ordered in a line or are rowed at an angle which corresponds to an angular position between the lateral surface and the radial conveying element (28), with the result that in each case only one single grain (12) at the end of the row extends in a predefined path along the lateral (Continued)

surface (16) and, at the end of the separation process, leaves the outlet opening (26) approximately tangentially.

20 Claims, 25 Drawing Sheets

(58) Field of Classification Search
USPC ......... 222/216–225, 240–241; 221/278, 217; 111/170, 171, 174, 177, 183–185, 178; 198/550.01, 671
See application file for complete search history.

(56) References Cited

U.S. PATENT DOCUMENTS

| | | | | |
|---|---|---|---|---|
| 3,107,779 | A | * | 10/1963 | Naxon .................. B65G 33/00 198/670 |
| 3,741,717 | A | * | 6/1973 | Triplett ................ A23N 12/08 432/105 |
| 3,796,346 | A | | 3/1974 | Ribouleau |
| 5,082,141 | A | * | 1/1992 | Martin .................... B02C 4/16 221/203 |
| 6,062,438 | A | * | 5/2000 | Ellis ....................... A47F 1/035 198/671 |
| 6,112,679 | A | * | 9/2000 | Borstmayer ........... A01C 7/004 111/173 |
| 6,244,388 | B1 | * | 6/2001 | Yun .................... B22D 17/2007 164/312 |
| 8,434,416 | B2 | * | 5/2013 | Kowalchuk ............ A01C 7/126 111/178 |
| 2003/0047422 | A1 | * | 3/2003 | Koch .................. A23G 3/0068 198/657 |
| 2014/0058559 | A1 | * | 2/2014 | Haynes ................ A01K 5/0114 700/232 |

FOREIGN PATENT DOCUMENTS

| | | |
|---|---|---|
| DE | 2217513 A1 | 11/1972 |
| DE | 3633955 A1 | 5/1987 |
| DE | 3822437 A1 | 1/1989 |
| DE | 3826321 A1 | 2/1990 |
| DE | 4116724 A1 | 11/1992 |
| DE | 19636787 C1 | 4/1998 |
| EP | 0636306 A1 | 9/1997 |

* cited by examiner

DISTRIBUTING UNIT FOR GRANULAR MATERIAL, IN PARTICULAR A SEEDING UNIT

The present invention relates to a distributing unit for granular material such as seed grains, fertilizer, or the like. In particular, the invention relates to a seeding unit having the features of independent claim 1.

Distributing devices for granular material such as seed drills in particular are known in numerous design variants. Conventionally, grain is conveyed with the aid of an airflow into which grains are fed. The airflow, which acts as a carrier medium, is then fed to a distributor, which can lead to a plurality of hose lines that eventually terminate at coulters of the seed drill arranged side by side. The metering of the grains enables the volumetric flow of discharged grains to be varied. There are generally no other possibilities for influencing the metering of grains in the individual lines that lead to the coulters. While the grains can be fed regularly into the airflow, the constancy of the grain delivery during the air-supported transport is impaired to a greater or lesser extent, often resulting in the non-uniform deposition of grain at the coulters, which can lead to drawbacks in the spatial arrangement of the individual plants.

One device for rendering constant the flow of material in a seeder or seed drill is known from DE 196 36 787 C 1. The primary purpose of this device is to produce constant spacing of the particle, granulate or grain on a volumetric grain delivery basis, so that the grains can be deposited individually for the most part. The grains are conveyed in a seeding line after the metering unit or in the coulter via a cascade line or conduit composed of channels or a distributing flute via which the particles or grains are separated and lined up through multiple changes in direction. The discharge line is embodied as a multiple-part distribution line whose individual line elements are each arranged obliquely to each other such that the individual particles are arranged in succession by the influence of gravity and flow out in a zig-zag pattern, with at least the end line element having a channel-shaped cross section.

Moreover, a device that can be used universally for different grain sizes and seed types for the separation and discharging of granular material, particularly an individual grain seeding device, is disclosed in DE 36 33 955 A 1. For this purpose, a rotating narrow hollow cylinder with cell-forming recesses on its open front side, a stationary outer cover and a covering ring arranged within the hollow cylinder are proposed. A reservoir is separated by a wall from the hollow cylinder that has an opening to allow a limited quantity of material to be separated to pass through. One length of the cell-forming recesses is intended to be twice or multiple times the length of the grains to be separated. In addition, a suction opening is provided in the vicinity of a rear delimiting surface of the recesses. The quickly rotating hollow cylinder takes up several grains per recess from the grain supply, the outer cover covering the recesses in the filling zone and preventing the grains from falling out. Centrifugal force presses the grains into the recesses, while a brush scraper removes excess grains that fall back into the reservoir. As the hollow cylinder continues its motion, an outer delimiting wall ends, so that grains not held by suction in the recesses are discharged outwardly through centrifugal forces and fed back to the reservoir. An additional pneumatic scraper can support this separation of grains. At the delivery site, the suction is cut off, so that the grains are delivered from the recesses by centrifugal force and gravity.

In addition, DE 3822437 A1 discloses a bulk conveying device for such individual grain seeding devices that is intended to ensure that excess bulk particles are removed from the recesses and diverted in such a way that they are fed completely to the bulk reservoir.

A further individual grain metering device for sowing grains is known from DE 41 16 724 A 1. In this known metering device, moving spoon-shaped separating openings are formed for the accretion of individual grains through a thin-walled lateral surface of a rotating cylinder that is open to one side. The spoon-shaped openings overlap with a slot in the housing enclosing the cylinder, through which suction openings for suctioning and individually transporting the seeding grains are formed.

DE 2217513 C3 also discloses an individual grain metering device having a rotating distributor disc having two annular collars with openings for suctioning individual grains. A scraper ensures that only one hole at a time of a pair of openings of the two collars is loaded with a grain, which can then be delivered.

The known metering devices are either modified individual grain seeding units that enable precise separation of grains but are limited compared to volumetrically metering seed drills in their processing capacity and in their grain flow volume, and/or they are elaborate and prone to faults due to their construction and function. On the other hand, the add-on devices that have come to be known which are intended to improve the regular delivery of the seeding grains in volumetrically metering machines do not approach the separation quality of conventional individual grain seeding units.

One overriding object of the invention consists of improving the delivery precision and/or the grain spacing with volumetric grain conveyance to the extent that the metering of grain approaches or, ideally, reaches the separation quality of individual grain metering while simultaneously enabling a high grain volume flow. These specifications are to be achieved with a simple, robust construction with low susceptibility to faults and simple function, as is characteristic for volumetrically metering seed drills.

The object of the invention is achieved with the subject matter of the independent claim. Features of advantageous developments of the invention follow from the dependent claims. To achieve the abovementioned object, the invention proposes a distributing unit for granular material such as seed grains, fertilizers or the like with the features explained below which can particularly be used as a seeding unit of a distributing or seeding machine. The distributing unit according to the invention comprises a housing with at least one inlet opening for taking hold of and conveying granular material or conveyed seed grains as well as an outlet opening for delivering the granular material or the seed grains at substantially regular distances from each other. Moreover, the unit comprises a conveying device arranged in the housing with at least one rotating conveying element arranged or running approximately axially to the inner side of the housing for taking hold of, handling, conveying and/or lining up or grouping the granular material or the seed grains. The grains are preferably conveyed at a certain speed in the housing, so that, after passing through the inlet opening, they can be diverted, guided and brought into a regular arrangement with the aid of the resulting centrifugal forces and the structure of the inside of the housing. In this way, the grains are held with the aid of the speed-related centrifugal forces on an inner circumferential region of the housing and accumulate there and are aligned with respect to each other and lined up in a line or at an angle that corresponds to an angular position between the circumferential surface and the radial conveying element. The aim of this alignment is to allow only a single grain at the end of this alignment to pass through the outlet opening, with the respectively following grains always being released in substantially constant time intervals and/or grain spacing and delivered from the housing. Another result of this arrangement and grouping of the grains being conducted quickly through the housing is that they are guided on a predefined path along the circumferential surface of the housing interior and leave the outlet opening (26) approximately tangentially at the end of the separation process.

In the distributing unit according to the invention, it can also be advantageous if the grains transported or carried along by the conveying element do not agglomerate too densely in the housing but rather have or form free space at least on one side in order to be able to push excess grains aside so that an approximately linear grain alignment can be achieved on the conveying element. In this context, "linear grain alignment" can refer particularly to a grain alignment parallel to the surface of the conveying element or parallel to the longitudinal direction of extension of the housing. The alignment on the conveying element or in the inner circumferential region of the housing should have a slight, directed advancement in one direction in order to reliably position the respective grain being discharged in a targeted manner and in order not to leave any gaps that would lead to irregular grain spacing.

The housing can in particular have a cylindrical inner lateral surface or optionally can also have an inner circumferential surface that tapers conically on one side. Moreover, other housing contours are also conceivable, for example an elliptical housing interior, or one which tapers or expands with another contour. In contrast, the inner circumferential surface of the housing should not have any pronounced steps or edges that might counteract the transport of the grains or impart increased resistance against the grain flow.

One preferred design variant of the distributing unit according to the invention is impinged with an airflow guided through the inlet opening which simultaneously conveys the granular material or the seed grains and also leaves the housing through the outlet opening. This airflow simultaneously serves to keep the grains in the housing in motion and to guide and convey them on their intended path. The grains can be fed from a central container through the inlet. Optionally, smaller intermediate containers can also be provided for the grains that are associated with each distributing or separation unit. There, the grains can optionally also be supplied with the carrying airflow. The airflow with which the grains are advanced then leads through the metering device or the unit and carries the delivered grains in or to the discharge. The airflow can advantageously ensure that the grains are able to flow with the carrying airflow through the metering device even when the conveying element is at a standstill.

Instead of using a carrying airflow, the grain conveyance can also be achieved by purely mechanical means, particularly through the rotational movement of the conveying element, which forces the grains within the housing into a circular or spiral-shaped motion, thus providing for the desired separation when the grains are delivered through the outlet opening. The rotating conveying element can particularly have an electromotive drive that enables the rotational speed to be adjusted as needed.

Before being discharged through the outlet, each conveyed grain undergoes a circular motion or a spiral-shaped path of motion that covers an angle of at least 360 degrees, the grain being held by the at least one conveying element on an approximately cylindrical or conical lateral surface while simultaneously experiencing a slight axial advancement in the direction toward the grain discharge at the outlet. In this context, it is expedient if the advancement of the grains is predetermined by a guiding contour at least in the area of the outlet opening for the last grain—i.e., for the grain that was just delivered.

Another configuration feature of the distributing unit according to the invention which has proven to be especially advantageous is one in which the inner circumferential surface of the distributing unit according to the invention is structured in the form of a continuous spiral or guideway that extends from an inner end to the opposing end or a subsegment thereof. Optionally, this spiral-like structure can have a continuous, constant pitch, or segments can each have different pitches, the pitch toward the outlet opening preferably being greater than in the region of the inlet opening. If the pitch in the direction of or in increasing proximity to the outlet opening becomes greater, then the width of the groove formed as a result of this structure can expediently be coordinated with the grain size, so that the grains are directed and guided by the spiral-shaped grooves formed by the structure until they successively pass individually through the outlet opening. In the front region closer to the inlet, the structure can optionally also be narrower or have a smaller pitch, since the grains generally agglomerate there more strongly anyway and form a kind of buffer, so that the direct guidance of each individual grain on the guideway formed by the structure is not yet required to the same extent as in the direction toward the grain outlet.

Expedient orders of magnitude for the pitch have turned out to be, for example, measurements of about 6 to 7 mm per winding at the outlet and about 3 to 3.5 mm per winding at the inlet for the sowing of wheat seeds. Depending on the grain size, other pitch dimensions are also possible and expedient.

The cleaning action of the structure has proven especially advantageous, since it can effectively prevent contaminants and foreign substances from adhering and remaining behind. While such foreign substances, such as blades of grass, are difficult for a smooth, unstructured wall to carry along, the structure in connection with the constant movement of grain ensures that all such contaminants and foreign substances are carried along, so that they can be discharged from the housing without further faults.

One characteristic feature of the distributing unit is that nearly all of the grains in the metering device are in motion, this motion being brought about by the conveying element and/or the airflow. By virtue of its special type of grain conveyance, the metering device is easily capable of balancing out brief fluctuations or irregularities in the grain supply and therefore carries out the function of a buffer in the event that the volume of the grain flow in the metering device should fluctuate or suddenly decrease.

In conjunction with the uniform airflow and the spiral-shaped structure of the inner circumferential surface of the housing, the conveying device embodied, for example, as uniformly rotating, paddle-like conveying elements in the housing, enables an evening-out of the flow of material (grains, seed grains, etc.), which leads to equidistant delivery at the outlet, which, with the delivery speed and delivery direction to be kept uniform and precise, in turn, can make for a very uniform grain separation.

One specific embodiment of the distributing unit according to the invention for granular material such as seed grains, fertilizer, or the like, which can particularly be a distributing or seeding machine, has a housing with a cylindrical inner circumferential surface and at least one inlet opening leading thereto for an airflow and granular material conveyed therein. A conveying device for the granular material carried in the airflow rotates concentrically in the housing and conveys it to at least one outlet opening, which is approximately tangential to the inner circumferential surface. The conveying device has at least one paddle-like conveying element sweeping along the inner circumferential surface. In addition, the inner circumferential surface of the housing has a structure in the form of a continuous spiral that extends from one end to the opposite end. In the direction of rotation of the conveying device, the spiral-shaped structure is aligned in the direction of the outlet opening and leads thereto. In the direction of rotation of the conveying device, the spiral-shaped structure begins in the region of the inlet opening and thereby connects the inlet opening to the outlet opening, so that the grains carried by the airflow pass through the inlet opening, are ordered and evened out by the conveying device in conjunction with the spiral-shaped structure of the walls, and finally leave the outlet opening as a substantially uniform flow of granular material.

Another variant of the distributing unit according to the invention makes a provision that a longitudinal edge of the at least one paddle-like conveying element extends parallel to the direction of longitudinal extension of the housing, a narrow end of the conveying element normally being shorter than the longitudinal edge and measuring, for example, less than half of the interior diameter of the housing. Optionally, the rotating conveying device can have two, three, four or more similarly or differently shaped paddle-like conveying elements, each of which is spaced equally from the others on a central shaft. In order to prevent jams, the paddle-like conveying elements can each be mounted resiliently (optionally also elastically) to the central shaft, so that they can give way under high resistance.

Optionally, the grain conveyance can be improved by providing the paddle-like conveying element with a concave curvature in the direction of rotation. In addition, it is expedient if the spacing of the at least one paddle-like conveying element from the inner circumferential surface of the housing is short and shorter than half of the smallest grain diameter of the material to be delivered and distributed. The spacing of the conveying elements or conveying paddles from the housing wall should not be less than a minimum distance in order to prevent seizing, particularly when foreign substances or contaminants get into the housing. However, the spacing should also not be too large, so that grains by no means make their way between the housing wall and the outer circumferential edge of the conveying elements, which might lead to disruptions in the grain transport and to jamming. A distance of about 0.2 to 0.5 mm to the wall, particularly about 0.3 mm, has proven suitable in practice.

Moreover, in the interest of high distributing and separation quality, the at least one paddle-like conveying element should extend widthwise over a portion of the outlet opening, so that the outlet opening is swept over when the conveying device rotates. Through introduction of a uniform, non-pulsing airflow with approximately constant volumetric airflow and grains carried along into the interior of the housing with the conveying device rotating therein, a functional individual grain seeding unit is made available in which the grains are delivered individually and at uniform intervals with respect to each other through the outlet opening. The cited volumetric airflow can optionally also be made dependent on the travel speed of the tractor. In addition, a separate drive of the conveying element can optionally be omitted, so that it is only caused to rotate passively by the volume of airflow.

The rotational speed and the number of paddle-like conveying elements expediently depends upon the respective seed material being conveyed and separated. For the sowing of rapeseed, for instance, the use of a single conveying element or conveying paddle which should also rotate relatively slowly has proven expedient. For the sowing of wheat, however, two opposing conveying elements or conveying paddles that rotate relatively quickly—at a frequency of about 25 to 50 Hz, for example—has proven to be an expedient structural variant. With two conveying elements, a grain frequency at the outlet of about 50 to 100 Hz is obtained.

A central shaft of the conveying device can be driven by electromotive means, for example. Optionally, in a simple drive variant of the conveying device, the paddle-like conveying elements can also be driven by the airflow guided through the inlet opening into the housing. The paddles can optionally be driven by electromotive means for greater delivery precision, it not being desirable in the interest of constant and equidistance grain delivery to modulate the drive speed, but rather only an adaptation of the traveling speed of the associated carrier machine (e.g., the seed drill). In the event that a motorized drive for the conveying device is omitted, which is certainly expedient depending on the delivery precision desired, only the airflow that enters the housing through the inlet opening and carries the grains along provides for the driving of the conveying device and the conveying elements, which is inevitably associated with a loss in delivery precision. However, this can be acceptable depending on the specific application and compensated for at least in part by the very simple and cost-effective construction of the seeding unit, which comprises very few parts in that case.

Besides the distributing unit, the invention also comprises a multi-row distributing machine for granular material such as seed grains, fertilizer, or the like, particularly a distributing machine or seed drill having multiple similar distributing units according to one of the previously described design variants arranged next to each other.

It should be noted again here that the inner circumferential surface in which the conveying device rotates need not necessarily be cylindrical, but can also taper conically on one end. The conveying elements of the rotating conveying device can be adapted with a commensurate inclination to such a conical inner circumferential surface such that its spacing from the wall is uniformly short. The spiral-shaped structure of the inner circumferential surface can also be adapted to such a shape or, depending on the design variant, it can also be omitted, and the incline of the structure can remain constant over the conically tapering interior diameter of the housing. Independent of the shape of the inner circumferential surface, it may be expedient to adapt the incline or dimensioning of the structure to the typically used grain sizes and/or to the volumetric flow of conveyed grains. The inner circumferential surface can optionally also be cylindrical and have a smooth, unstructured inner surface, in which case a direction of conveyance of the granular material must be ensured solely by the airflow and/or by a slightly angular disposition of the conveying element (e.g., slight screw shape).

The most important as well as some complementary aspects of the present invention will be repeated below with particular emphasis on explaining conceivable variants of the specific design of the distributing unit according to the invention with its structural details. The distributing unit defined with the present invention is used to achieve delivery of granular material such as seed grains, fertilizer, etc., that is as uniform as possible and, depending on requirements and the configuration and mode of operation, separated as well. Therefore, if there is mention of a "distributing unit" in the present context, what is generally meant is a seeding device of a distributing machine or seed drill. In such a seed drill, multiple similar seeding units are normally arranged next to each other in order to enable sowing of multiple rows.

All of the structural variants of the distributing unit or seeding unit according to the invention included by the invention comprise, respectively, a cylindrical housing with a cylindrical inner circumferential surface and an inlet opening leading into the housing for an airflow with granular material or seed grains conveyed thereby. The cylindrical housing can have an oblong shape, so that the length of the cylindrical shape is greater than the diameter of the housing. Optionally, however, the housing can also be relatively short, so that its diameter can optionally be greater than its length between the ends of the cylindrical shape. Independently of the length of the cylindrical housing, the inlet opening leads tangentially into the housing at one of the two opposing ends of the cylinder formed by the housing, so that the airflow can also enter the interior of the housing tangentially. Normally, a connection port or the like is provided which contains the inlet opening and sits on the outside of the housing and leads tangentially into it. Located on the other end of the housing, which lies opposite the end with the inlet opening, is an outlet opening of the distributing or seeding unit which, in turn, is arranged tangentially to the cylindrical inner circumferential surface of the housing, so that the inlet opening and the outlet or discharge opening are either arranged parallel to each other or at least their central axes lie on parallel planes. In the case of an inlet opening leading perpendicularly from above into the housing and an outlet opening leading perpendicularly downward out of the housing, their central axes are arranged parallel to each other, but this does not necessarily have to be the case, because, for the trouble-free functioning of the distributing or seeding unit, it is neither absolutely necessary that the inlet opening run perpendicularly downward nor that the outlet opening be aligned perpendicularly downward. Both openings can optionally also run at an angle to vertical or horizontal. In the interest of trouble-free functioning of the separation of the material or seed grain and/or the uniform delivery of grains, tangential transitions between the cylindrical outer contour and the inlet and outlet openings are absolutely expedient.

Furthermore, the seeding or distributing unit according to the invention comprises an auxiliary means that facilitates or improves the equal distribution of material introduced in the airflow into the interior of the housing or seed grains carried by the airflow. Accordingly, a conveying device is located on the interior of the housing and pivotally mounted therein which can rotate concentrically in the housing or concentrically to the cylindrical housing inner surface. The rotating conveying device not only serves to transport the granular material carried in the airflow and seed grains transported by the airflow, but also to even out the transport of the material or grain within the housing, since its rotation slows down the grains that are moving too fast but also carries along and accelerates those grains that are greatly decelerated within the housing. The airflow flowing into the housing through the inlet opening and the rotating conveying device convey the seed grains to the outlet opening, which is approximately tangential to the inner circumferential surface of the housing and can lead or empty into a seed line, a coulter, or the like leading into the ground. The conveying device can have multiple paddle-like conveying elements sweeping along the inner circumferential surface of the housing that are attached in an opposing manner on a shaft rotating concentrically in the housing. Optionally, at least one such paddle-like conveying element is present that rotates in the housing, in which case no sliding contact of the conveying element with the housing inner circumferential surface is expedient, but rather a slight spacing is preferred, which however should not allow any grains to pass through. Typically, two, three or four such paddle-like conveying elements are arranged on the shaft, each being spaced uniformly from the others, or in uniform distribution.

The term "paddle-like conveying element" expresses how the conveying elements can be designed. Accordingly, the conveying device is normally not formed by closed shovels that form the conveying elements in a star-like arrangement, but rather it has conveying elements that have a slider segment that reaches to just short of the inner circumferential surface of the cylindrical housing. The length of the conveying device can optionally be set up such that the opening area of the air inlet is not swept over or only in part, so that an inner end of the conveying element is spaced apart from the corresponding inner end of the housing. Such a setup can improve the distribution of the grains in the housing interior space. On the outlet end, the conveying elements can optionally sweep over the outlet opening, since the grains are supposed to be released from the housing in an equidistant manner, which is facilitated by a uniformly rotating conveying device and conveying elements sweeping with commensurate uniformity over the outlet. In this way, the paddle-like conveying elements of the conveying device provide for a distribution and equalization of the flow of grains, which might initially tend to aggregate in the vicinity of the inlet opening but are ideally lined up on the conveying elements as a result of the rotational movement such that the grains are delivered individually and in constant intervals and with constant delivery direction through the outlet opening, whereby the object of the present invention—the equalizing of a flow of material for the separated delivery of grains—can be achieved to the greatest possible extent.

The conveying device rotating within the housing can optionally be caused to rotate with the aid of the airflow entering through the inlet opening into the housing of the distributing unit, that is, it can have a passive drive. It is also possible, however, to have the conveying device rotate by means of an external drive, optionally with a controllable rotational speed. An electromotive drive can be suitable for this, for example, and can be arranged on the outside of the housing of the distributing unit. Hydrostatic drives or belt drives with a central drive motor are also conceivable.

Another expedient option of the present invention can consist of outfitting the inner circumferential surface of the housing with a structure in the form of a continuous spiral. Such a spiral-shaped structure can extend, for example, from a first end on which the connection port is arranged with the inlet opening to the opposite end on which the outlet opening is located. What is more, this optional spiral-like structure is aligned in the direction of rotation of the conveying device in the direction toward the outlet opening and leads thereto. The spiral-like structure can therefore begin in the direction of rotation of the conveying device in the region of the inlet opening, thus connecting the inlet opening to the outlet opening, so that the grains carried by the airflow pass through the inlet opening through the connection port, are ordered and evened out by the paddle-like conveying elements of the rotating conveying device in conjunction with the spiral-like structure of the walls and finally leave the outlet opening as a largely uniform and, ideally, separated flow of seed grains. The abovementioned spiral-like structure can optionally have different pitch segments and be subdivided into a deceleration and separation winding. The deceleration thread outfitted with a low thread pitch is located near the inlet and at the inner end, whereas the separation thread adjacent thereto can have a greater pitch in the direction toward the outlet and the second end, so that the individual thread turns have a width that corresponds approximately to the diameter of the grains to be separated, so that they are guided in the thread turns. Other designs are also conceivable, such as a structure that begins at a defined distance from the inlet end of the housing and/or does not quite reach to the opposite end and/or has variable channel depths.

With the design described above, the uniformly rotating paddle-like conveying elements of the conveying device, in conjunction with the uniform airflow running through the housing and possibly the optional spiral-shaped structure of the inner circumferential surface of the housing, can bring about an equalizing of the material flow (grains, grain seeds, etc.) which ideally leads to an equidistant delivery of the grains or of the granular material at the outlet. In this way, the seeding or distributing unit according to the invention provides uniform, high-quality grain separation, provided that not too many grains are transported in the airflow and the rotating shaft does not rotate too quickly.

In the region or in the vicinity of the inlet opening, the grain conveyance or grain transport can still be disordered in part as the case may be, so that an optimal distribution of all of the grains to the respective conveying elements has not yet been achieved. Some of the grains are typically swirled in an uncontrolled manner in the housing, although due to the centrifugal forces acting after passing through the inlet opening, all of the grains are normally located on the inner circumferential surface and move in a circular or spiral-shaped movement in the direction of rotation of the shaft. After multiple gyrations and closer to the outlet opening, there are normally no longer any grains in the housing that are not positioned against and moved by the conveying elements, so that they are delivered from the housing in an ideal tangential motion as a separated flow of material downward through the outlet opening (or, depending on the direction of the outlet opening, obliquely or horizontally).

The separated alignment of grains on the conveying elements in the vicinity of the outlet opening normally ensures that, upon each pass of the end section of each conveying element pointing in the direction of the second end of the housing, only exactly one grain is diverted tangentially by the ramp leading tangentially away from the inner circumferential surface to the outlet. This ramp can optionally have a straight profile and provide for tangential grain movement through the outlet opening. In principle, however, the ramp can also have a different shape and have, for example, a profile that is curved in the direction toward the central axis of the housing which, after the tangential separating motion, can divert the grains into an axial movement that runs, for example, parallel to the direction of longitudinal extension of the housing. In principle, almost any direction can be imparted in this way to the grains in which they can leave the housing.

If the rotational speed of the conveying device is no longer sufficient for the quantity of conveyed material or inflowing air, or if the conveying device comes to a standstill in the event of a fault, the design of the paddle-like conveying elements provides for a sufficient open cross section in the housing interior between the inlet opening and the outlet opening, so that a portion of the conveyed grains can optionally be guided past the conveying elements between the central shaft and the clearance between the shaft and the conveying elements arranged on it, whereby the grains can leave the housing through the outlet. In order to ensure this, and in order to reduce the danger of blockage and hence to maintain operational safety, the longitudinal edges of the paddle-like conveying elements extend approximately parallel to the direction of longitudinal extension of the housing and of the shaft and have a width that extends over multiple tracks or grooves of the spiral-shaped structure. Normally, the narrow ends of the conveying elements extending radially in the housing are substantially shorter than the longitudinal edges and, in the depicted exemplary embodiment, measure less than one-third of the interior diameter of the housing.

According to a divergent design variant of the distributing unit or of the seeding unit, the conveying elements of the rotating conveying device can have a slightly helical profile in the direction parallel to the shaft, whereby the axial advancement of the grains in the direction of the housing outlet is produced and supported in a targeted manner. Here, the surfaces of the paddle-like conveying elements are curved in the direction of their longitudinal edges in such a way that a helical contour is produced in which an acute angle is formed between the direction of longitudinal extension of the housing and the surface of the conveying elements. In such a variant, the thread-like structure of the inner circumferential surface can optionally be omitted, since the helical contour of the conveying elements provides for the axial advancement of the grains. An edge protruding radially inward over the inner circumferential surface forms an axial advancement limit or guide, so that only the respective first lined-up grain leaves the metering unit. The slight axial advancement can also be achieved through the airflow and/or the constant supply of grains and the resulting slight inherent crowding. As will readily be understood, combinations of helical conveying elements and thread-like structures of differing shape and depth are also possible and expedient.

With respect to the size, shape and overall dimensioning of the individual conveying elements as well, different variants are possible. For example, depending on the structure, size and contour, the conveying elements can be especially well suited to the separation of wheat grains, while differently structured conveying elements can be used for rapeseed. Yet other, different variants can be suitable for soy beans or similarly shaped grains. Optionally, individual variants of the conveying elements can each be provided with counterweights, so that spring elements in the region of the swivel mount of the conveying elements on the shaft can optionally be omitted. In fact, the integrally formed counterweights can provide for the radial alignment of the conveying elements during rapid rotation of the shaft, while the conveying elements can easily give way and/or fold over against the direction of advancement in the event of an obstruction or resistance. For example, depending on the design variant, the rotating conveying device can have two opposing conveying elements that are anchored on the shaft by means of a suitable attachment, particularly with a spring-supported swivel mount, or a swivel mount that is held in its normal position by a counterweight. Variants are also possible, however, in which only one conveying element rotates or in which three, four or more similarly or differently shaped paddle-like conveying elements are provided, each of which is arranged at a uniform distance from the others on a central shaft and pivotally mounted. For example, a variant is possible which has four conveying elements, each being arranged at a 90° angle with respect to each other and uniformly distributed on the shaft.

The abovementioned variant with only one conveying element that can be structured in different ways can be used, for example, for separating rapeseed. Moreover, such a single conveying element can cooperate with semicircular discs that prevent the small rapeseed from flowing directly through the housing. The very small rapeseeds are thus decelerated on the discs embodied as baffle discs and prevented from advancing to the outlet in an uncontrolled manner. One of the semicircular discs rotating with the shaft can be arranged between the inlet opening leading axially to the inner end of the housing and the conveying element rotating at a distance from the inner end, while a second disc can be arranged in the vicinity of the outlet opening located in the outer end of the housing. While the first disc covers a circular segment of about 180° in the depicted exemplary embodiment, the second disc can cover a circular segment of 270°, for example, so that the rapeseeds located in the housing are effectively prevented from reaching the outlet prematurely before they are discharged there individually.

In order to prevent blockage, the paddle-like conveying elements can each be resiliently suspended on the central shaft, so that they can give way under increased resistance. The corresponding swivel mechanisms preferably each permit a swiveling motion of the conveying elements by a defined swivel angle as soon as they are blocked by too many grains, or by foreign substances such as stones, wood, or the like. Damage is prevented in this way. As mentioned above, counterweights can also be provided on the shaft instead of the resilient suspension in order to provide for the approximately radial alignment of the conveying elements and for their evasive movements as needed.

Moreover, the paddle-like surface of each conveying element can have an optional contour, for example a bend or a concave curvature. Such a contour can have an advantageous influence on the grain conveyance. In addition, it is expedient if the paddle-like conveying elements rotate at distances to the inner circumferential surface of the housing that are as small as possible. These distances should be smaller than half of the smallest grain diameter of the material to be distributed, so that there is no threat of jamming of the grains between the conveying elements and the inner circumferential surface of the housing. Furthermore, in the interest of high distribution and separation quality, the paddle-like conveying elements should extend widthwise over a portion of the outlet opening, so that the outlet opening is swept over by the conveying elements when the conveying device is rotating, and the uniformly distributed material is ejected almost tangentially. Through the application of a uniform, non-pulsing airflow with an approximately constant volumetric airflow and grains carried along into the housing interior with the conveying device rotating therein, a functioning individual grain seeding unit is made available in which the grains are delivered through the outlet opening individually and at uniform intervals.

As mentioned above, the central shaft of the conveying device can be driven by electromotive means, which corresponds to an active drive of the conveying device. Optionally, the central shaft of the conveying device and the rotating conveying elements can also be driven by an airflow conducted through the inlet opening into the housing, which corresponds to a passive drive.

In another alternative design variant of the distributing unit, a central shaft can be omitted where necessary. Instead, in this variant, the grains can be conveyed by a rotating housing section with cross bar and fixed winding through the housing in the axial direction to the grain outlet or to the outlet opening. The spiral with windings of constant pitch is stationary with respect to the rotating housing section and is spaced from the rotating inner circumferential surface of the rotating housing section which pushes the grains axially to the grain outlet. The windings are solidly connected to a stationary housing part and/or to the stationary grain outlet. In this variant, the grains are forced by the rotation-related centrifugal forces outward to the inner circumferential surface of the rotating housing section. The rotating cross bar provides for the advancement of the grains in the direction of rotation along the circumference of the housing, while the stationary windings of the non-rotating spiral provide for an axial advancement in the direction from inlet to outlet. In order to achieve this, the spacing of the spiral windings from the inner circumferential surface of the rotating housing section must be at least slightly smaller than the smallest grain diameter, whereas the thread pitch of the windings can be designed according to need. The pitch can be selected as a function of the grain size, the desired advancement in conjunction with the rotational speed of the cross bar, and other seeding parameters.

It does not require separate mention here that, in all of the variants described above, the two ends of the housing are normally closed. Optionally, it can also be expedient for the housing to have a modular construction composed of multiple segments embodied as rings and enabling varying housing length. Depending on the "flow behavior" of the grains in the spiral-shaped airflow, a shorter or longer housing can be favorable for the exactness of the grain separation. If multiple rings are joined together, the housing length can be varied in the desired manner through the number of rings installed.

Exemplary embodiments and their advantages are described in further detail below with reference to the enclosed figures. The proportions of the individual elements with respect to each other in the figures do not always correspond to the actual proportions, since some forms are depicted in a simplified manner, while other forms are enlarged in relation to other elements for better illustration.

Figure 1:
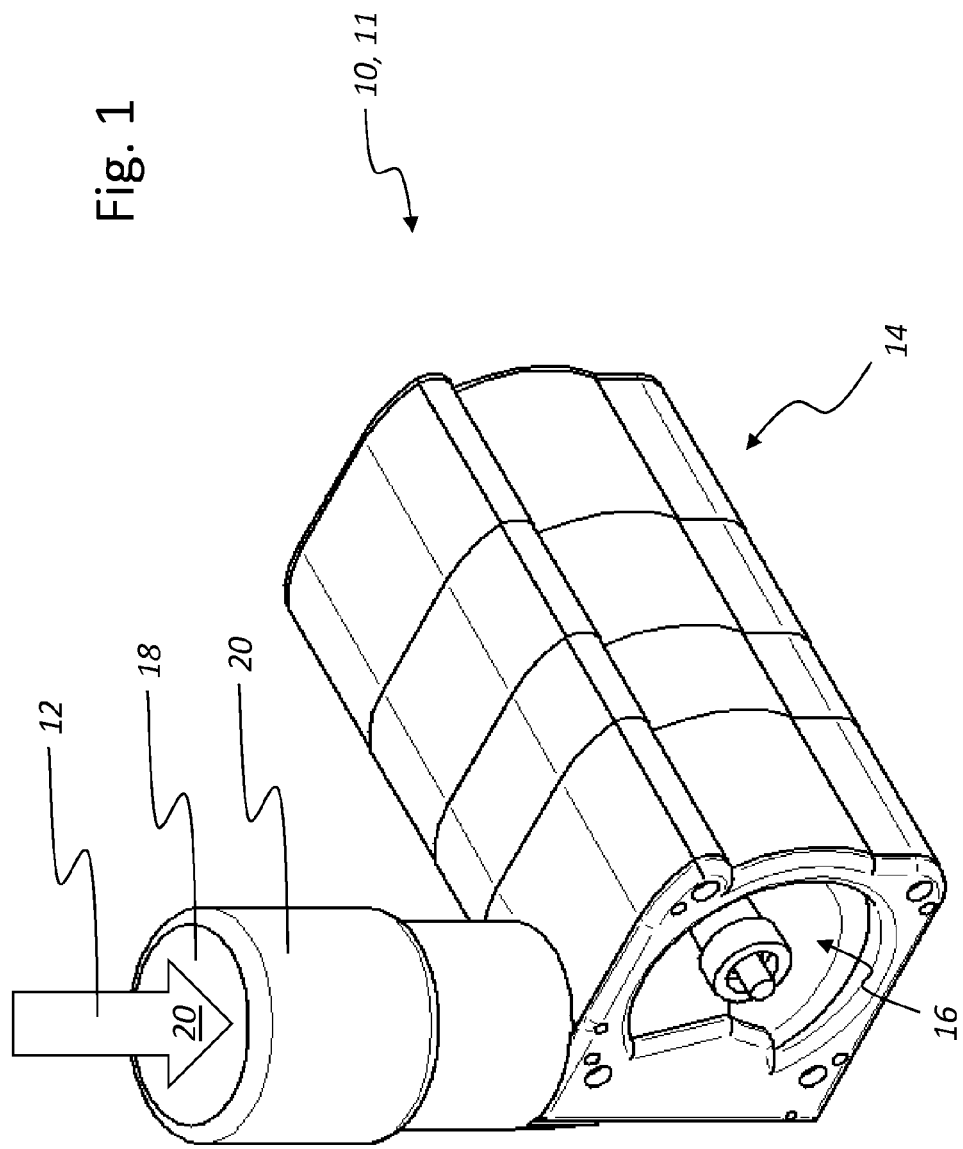
FIG. 1 shows a schematic perspective view of a design variant of a distributing unit according to the invention.
Figure 4:
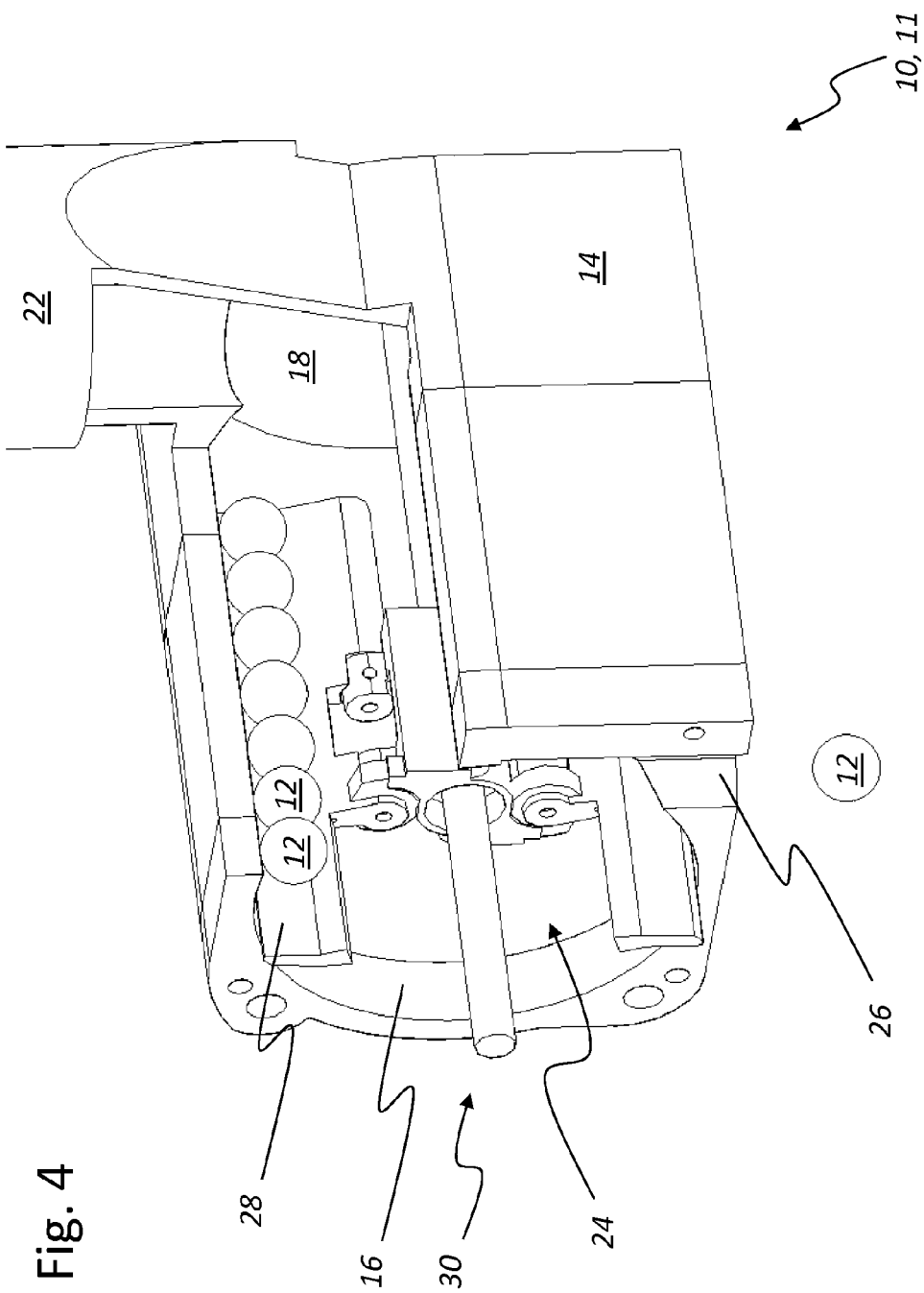
Figure 5:
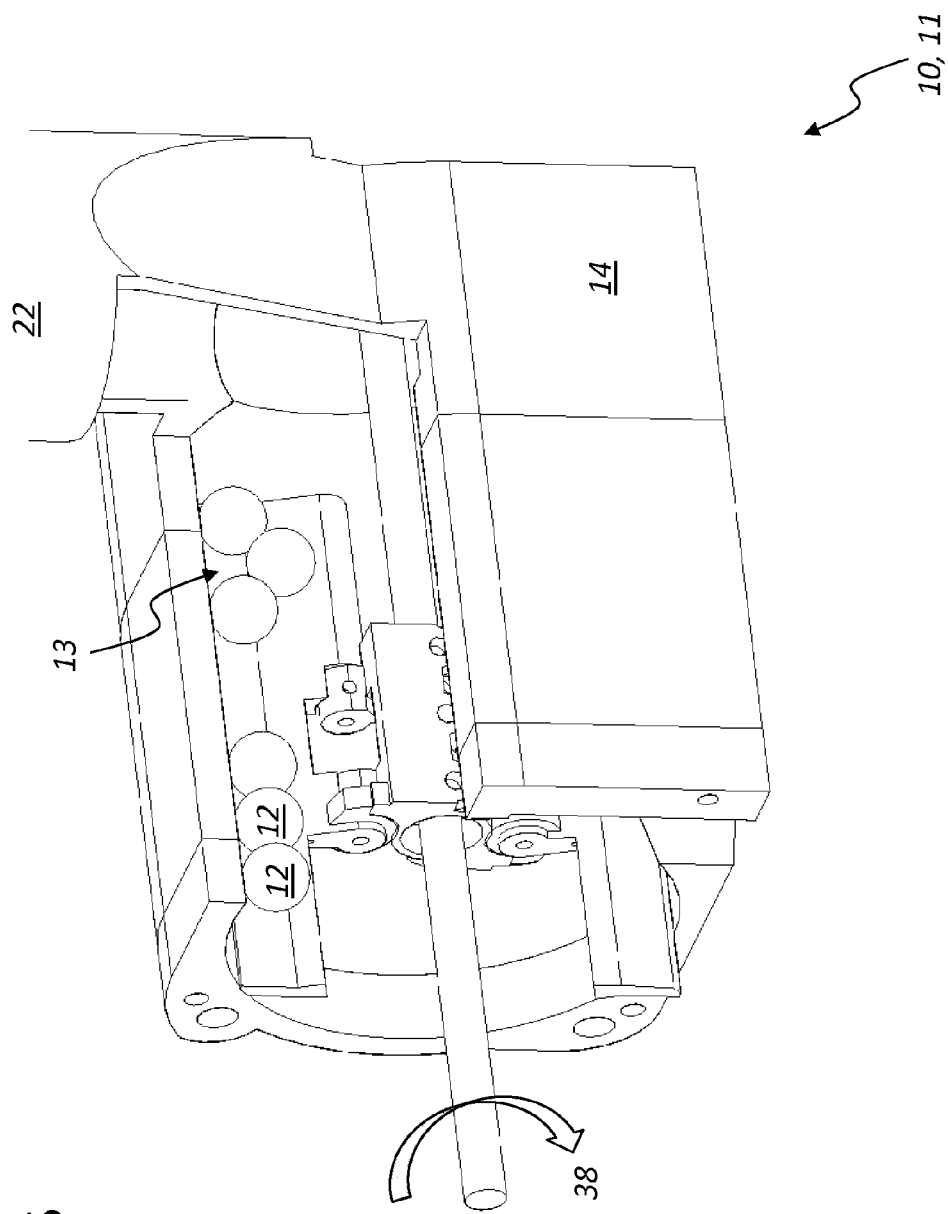
Figure 6:
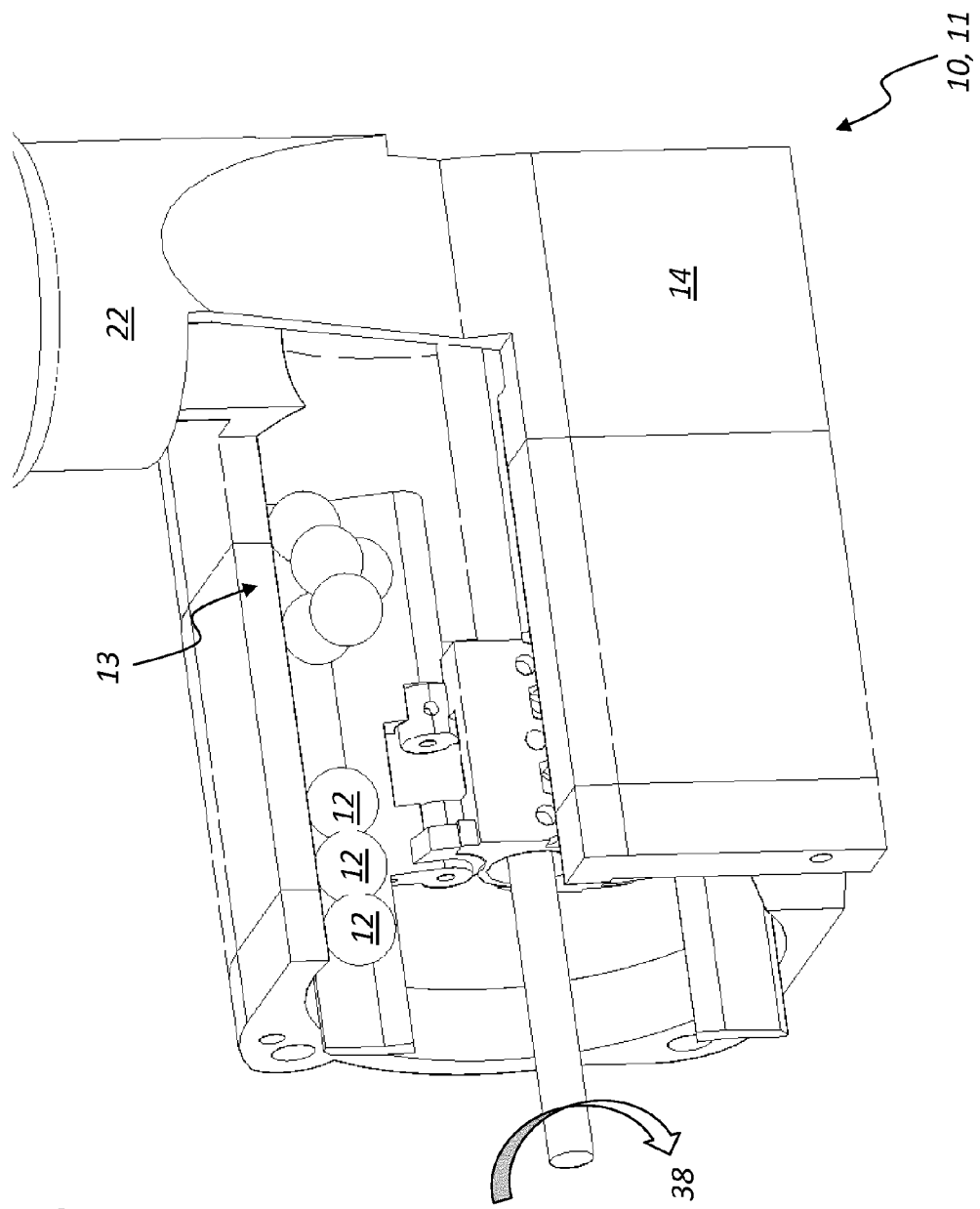

FIGS. 4, 5 and 6 each show perspective partial longitudinal sections of the distributing unit according to FIG. 1.

Figure 7:
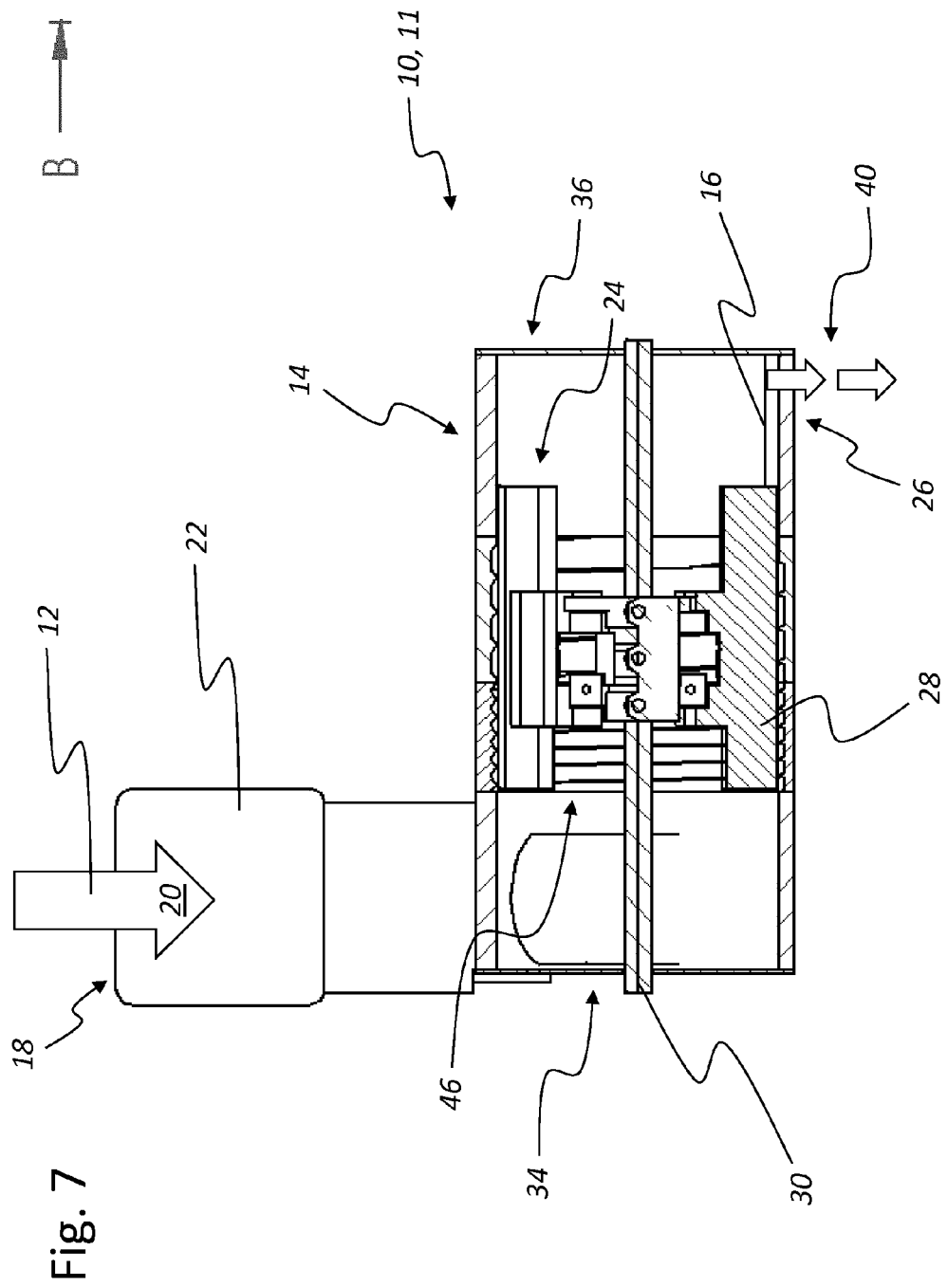

FIG. 7 shows a schematic longitudinal section through the distributing unit and through the central shaft of the rotating conveying device.

Figure 8:
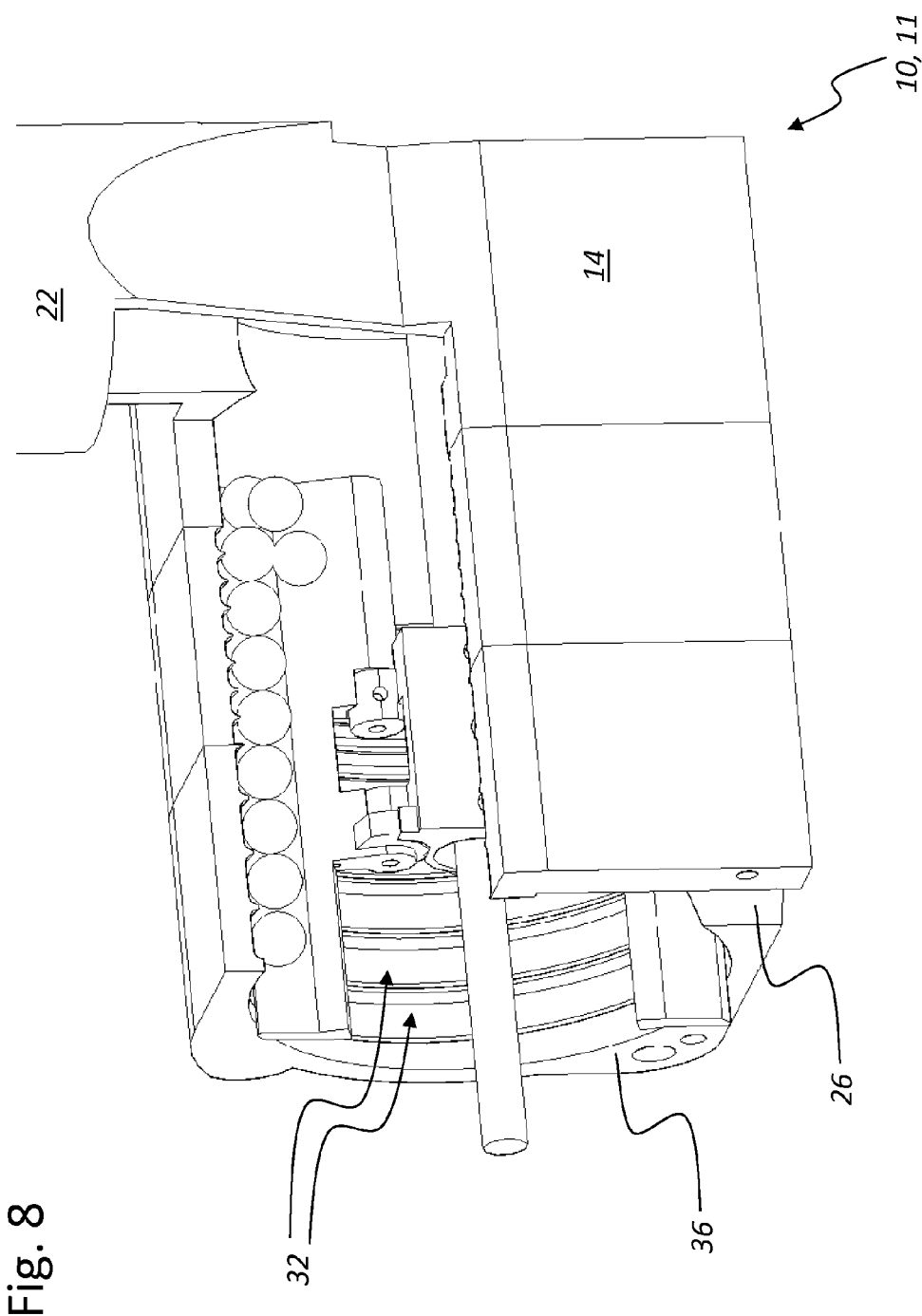

FIG. 8 shows a further perspective partial longitudinal section of the distributing unit.

Figure 9:
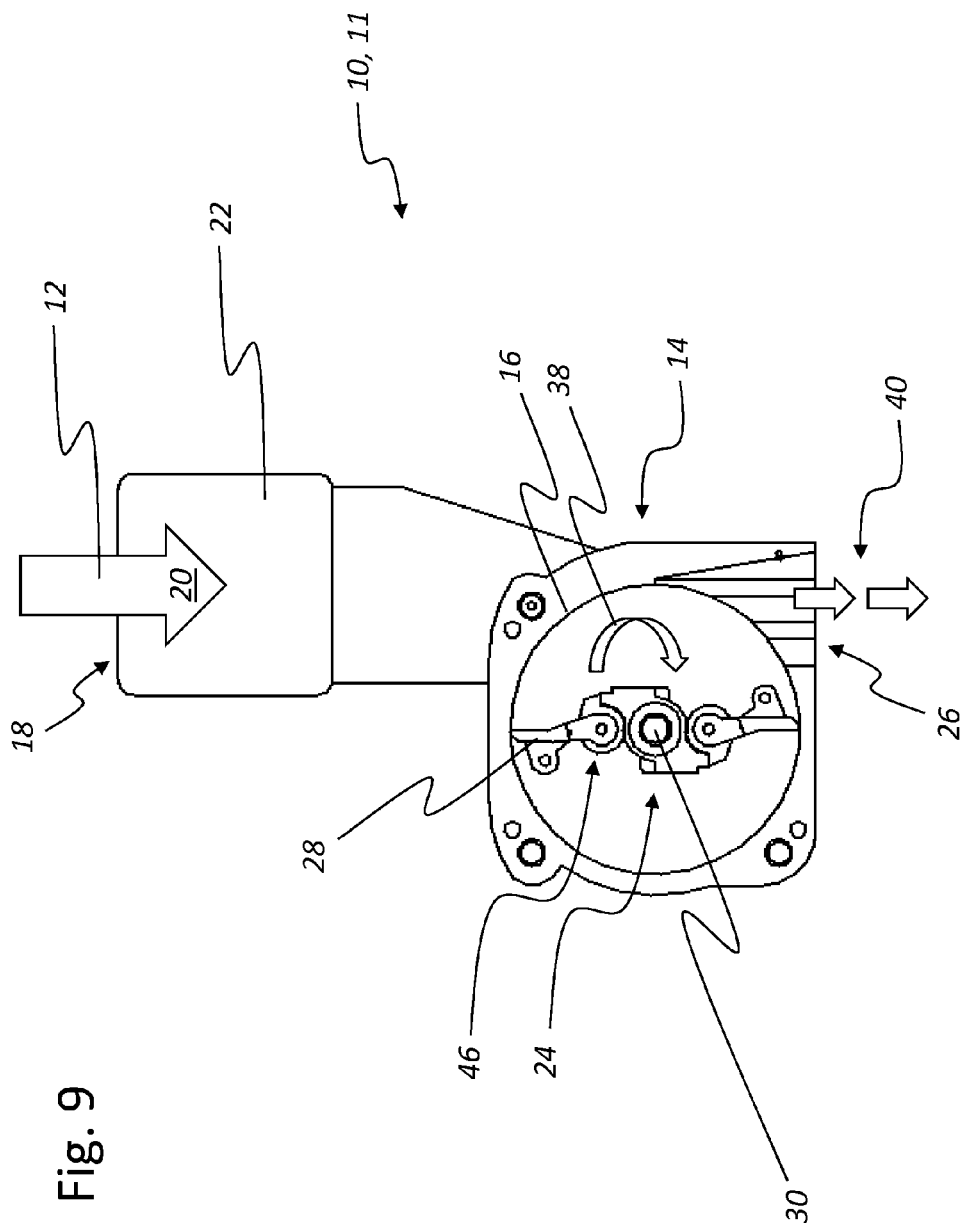

FIG. 9 shows an end view of an outlet end of the distributing unit with partially opened housing outlet end.

Figure 10:
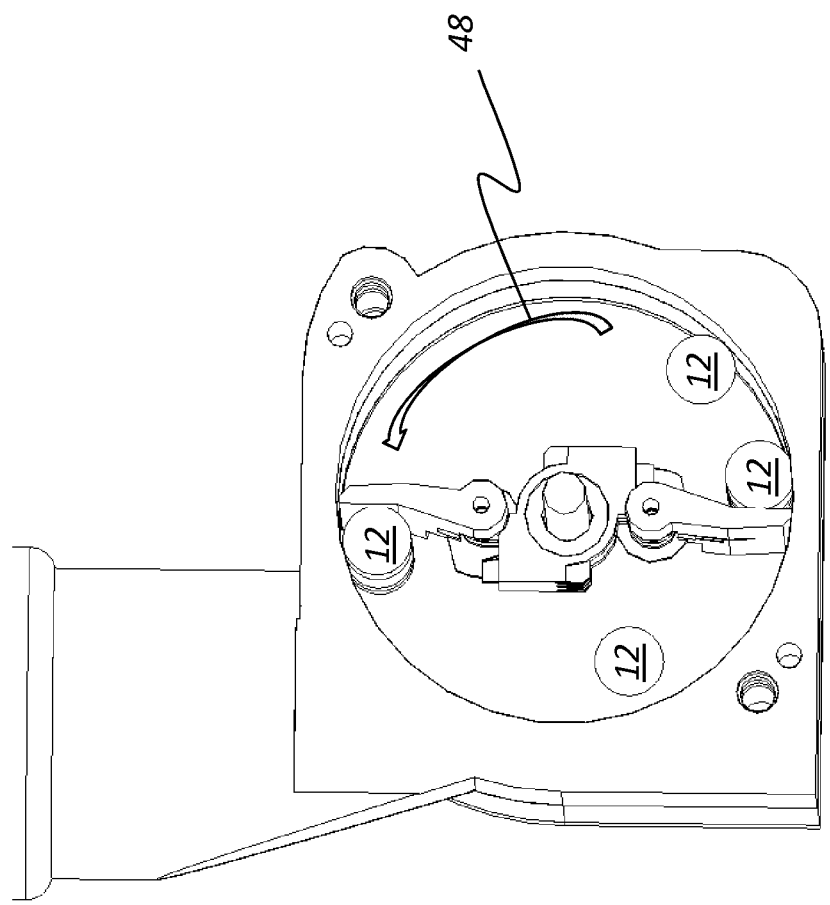

FIG. 10 shows a further end view of the opposing end of the distributing unit with opened housing.

Figure 11:
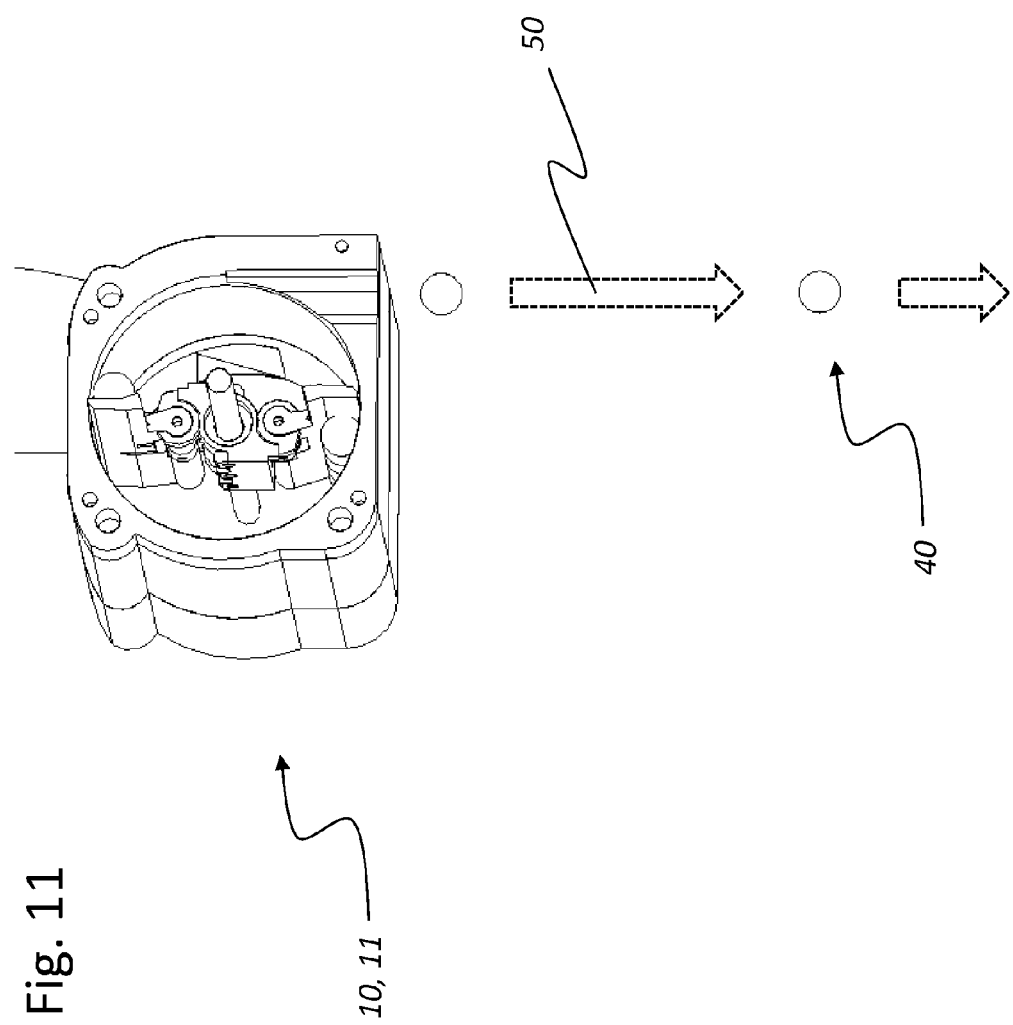

FIG. 11 shows a perspective view of the housing open on one side in order to clarify the grain transport upon separation of the grains from the housing.

Figure 12:
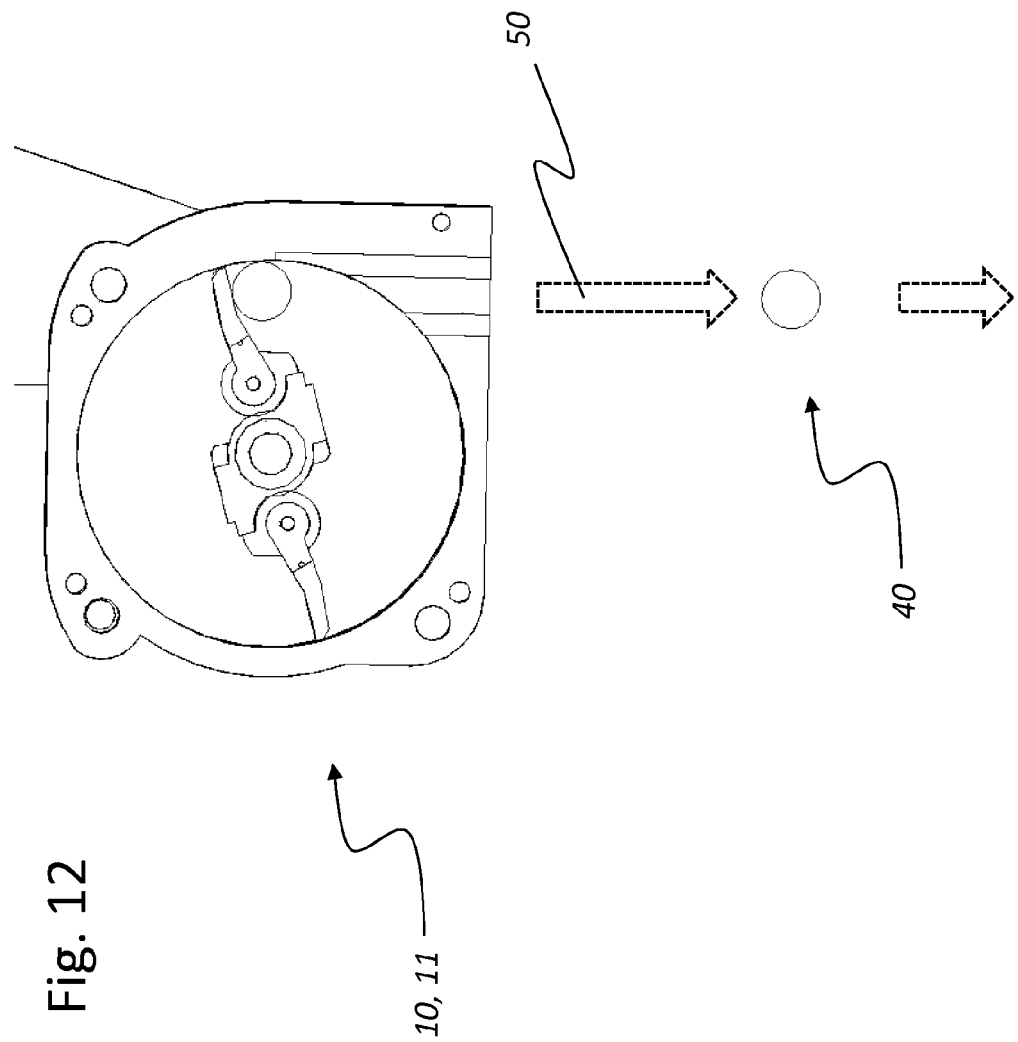

FIG. 12 shows the grain transport according to FIG. 11 in an end view.

Figure 13:
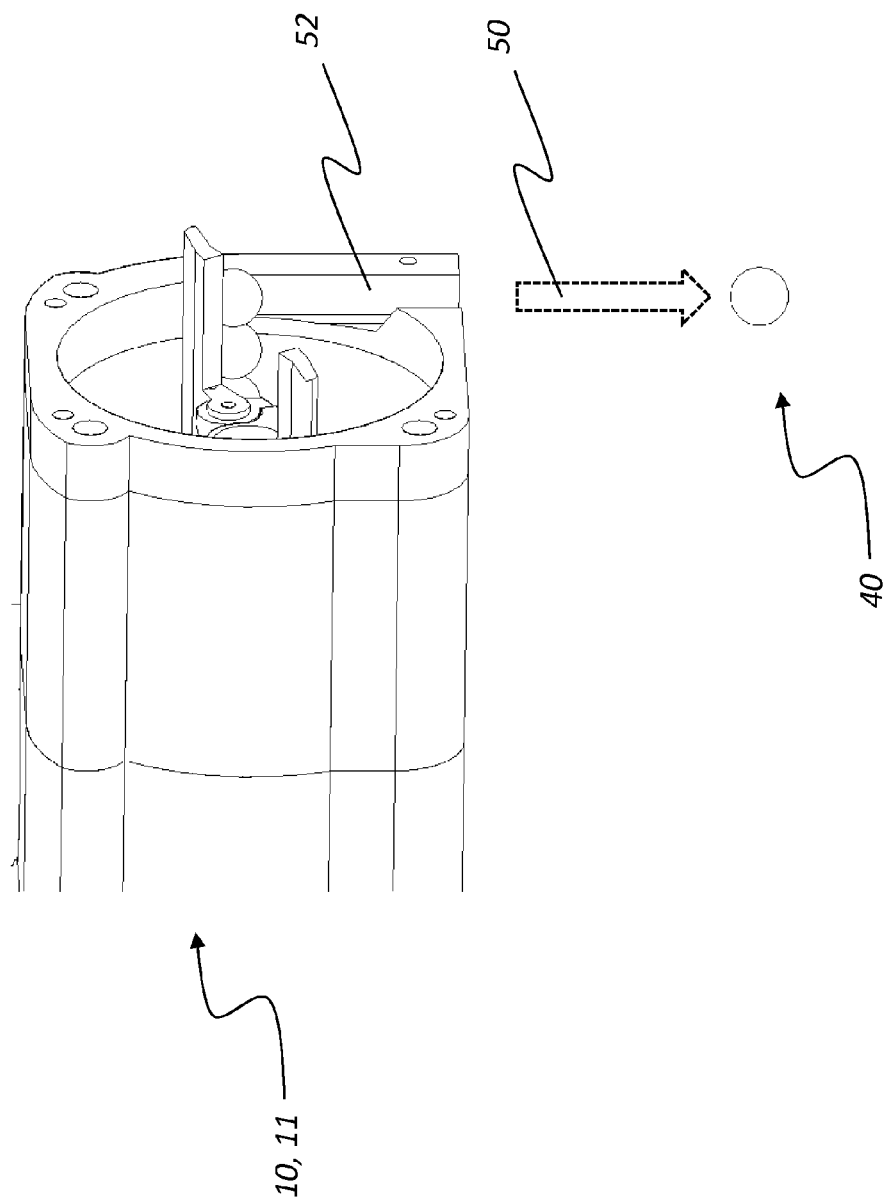

FIG. 13 shows the tangential separation of the individual grains of the housing in a perspective representation.

Figure 14:
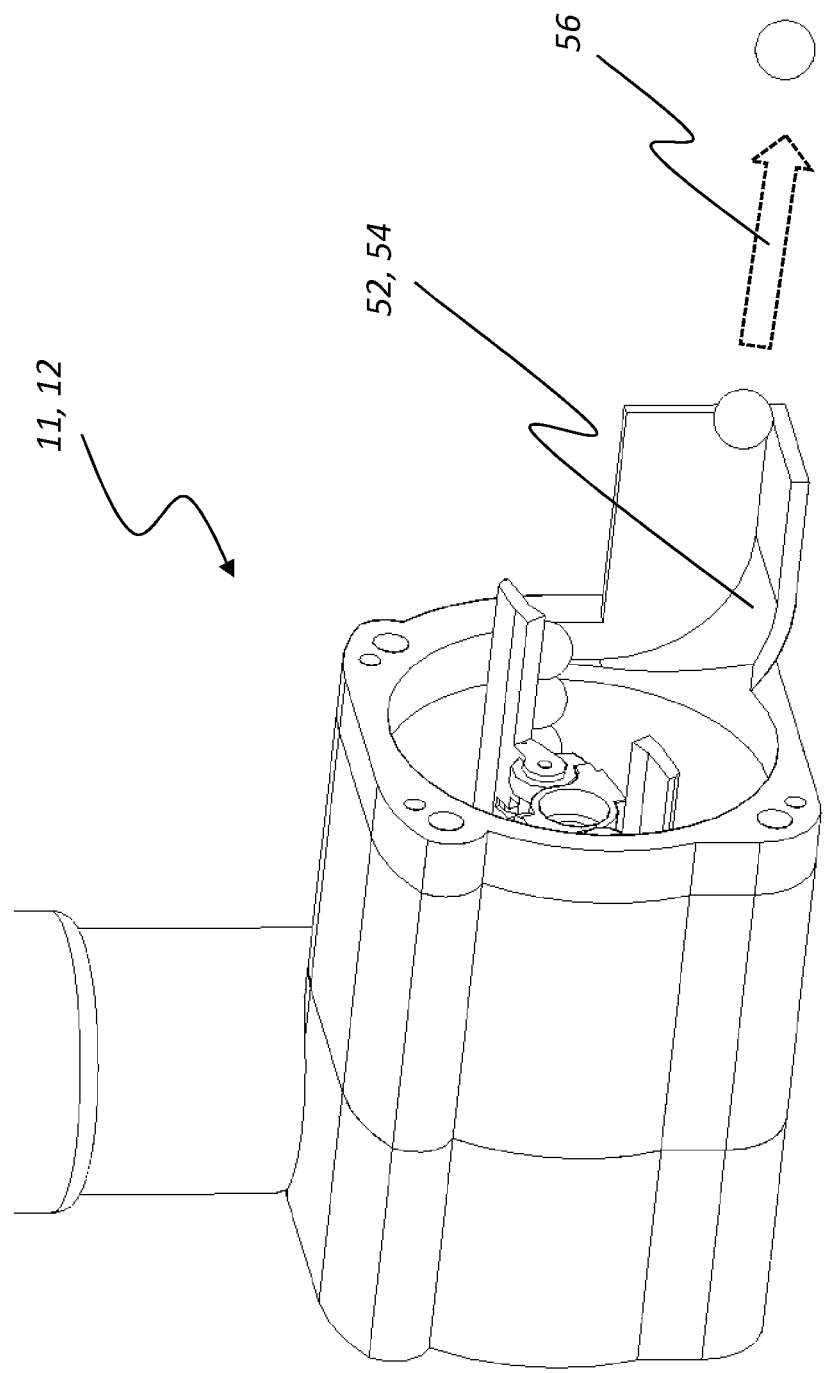

FIG. 14 shows an alternative design variant of the housing with curved guideway at the outlet opening for diverting the grains.

Figure 15:
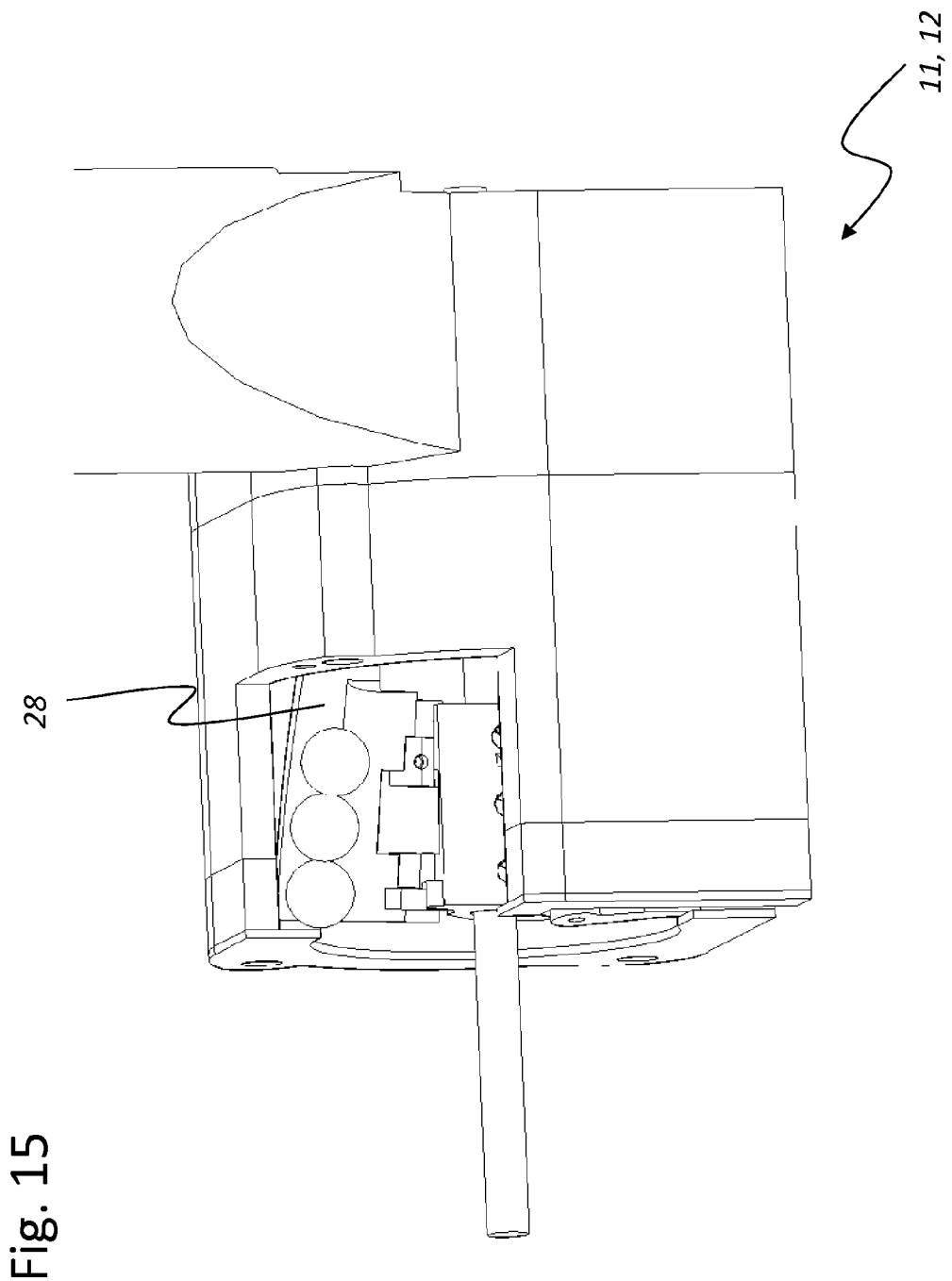
Figure 16:
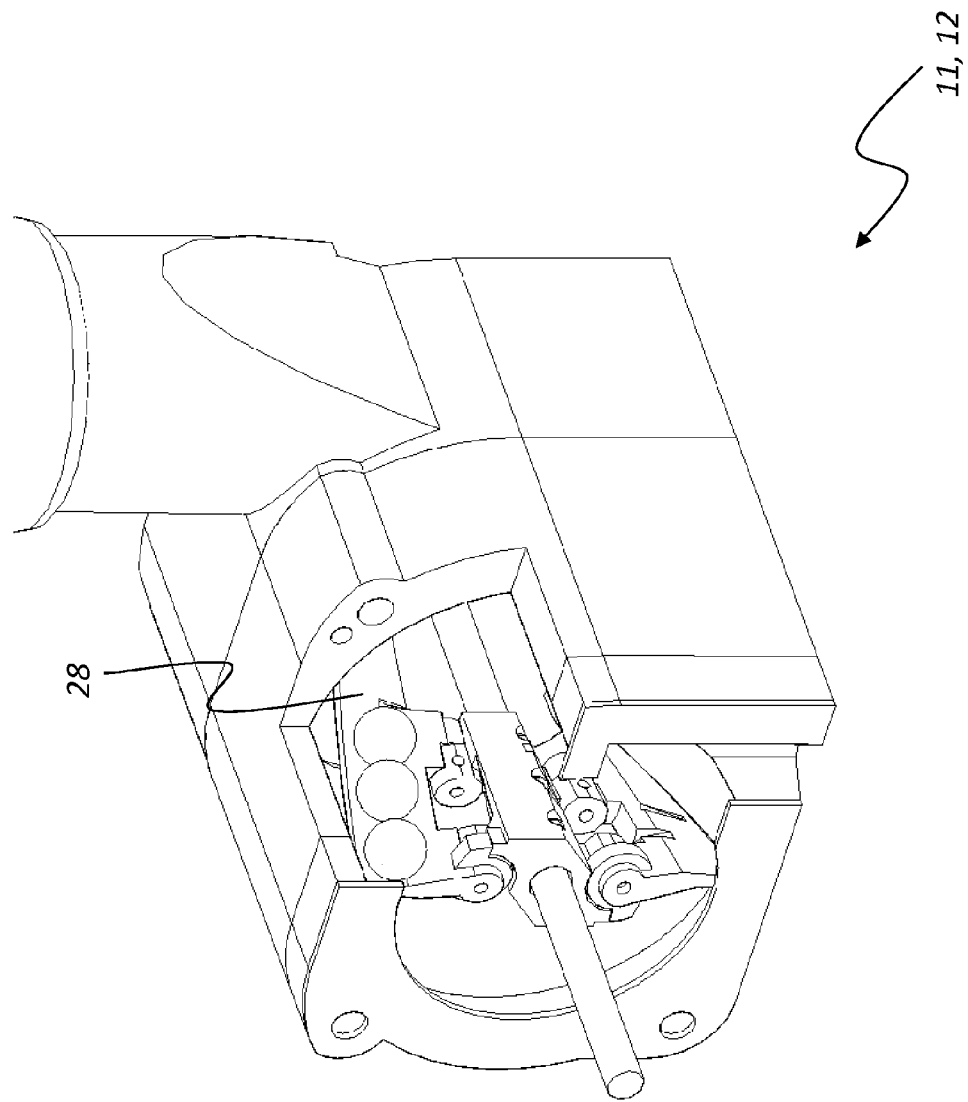
Figure 17:
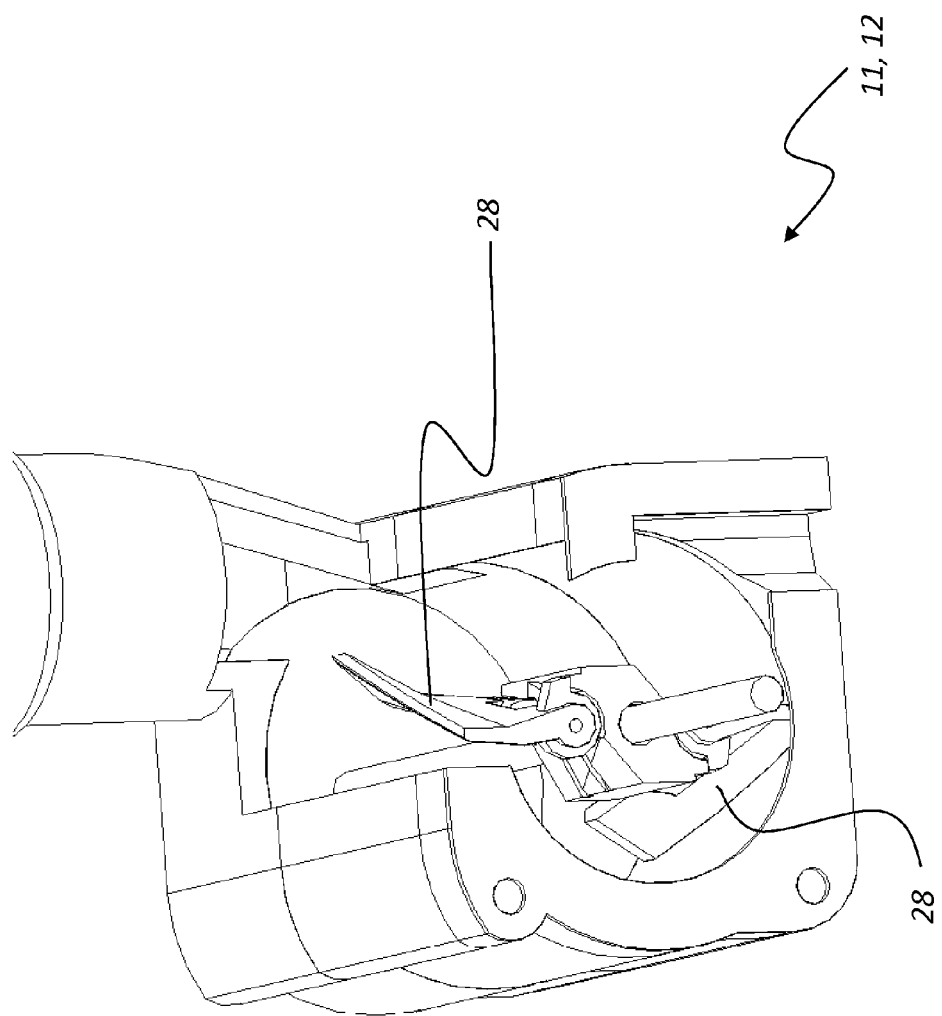

FIGS. 15, 16 and 17 each show perspective sectional views of a further design variant of the distributing unit with angled conveying elements for grain conveyance.

FIG. 18a shows five different design variants of the conveying elements in end view (top) and in perspective view (below that).

FIG. 18b shows another four different design variants of the conveying elements in end view (top) and in perspective view (below that).

Figure 19:
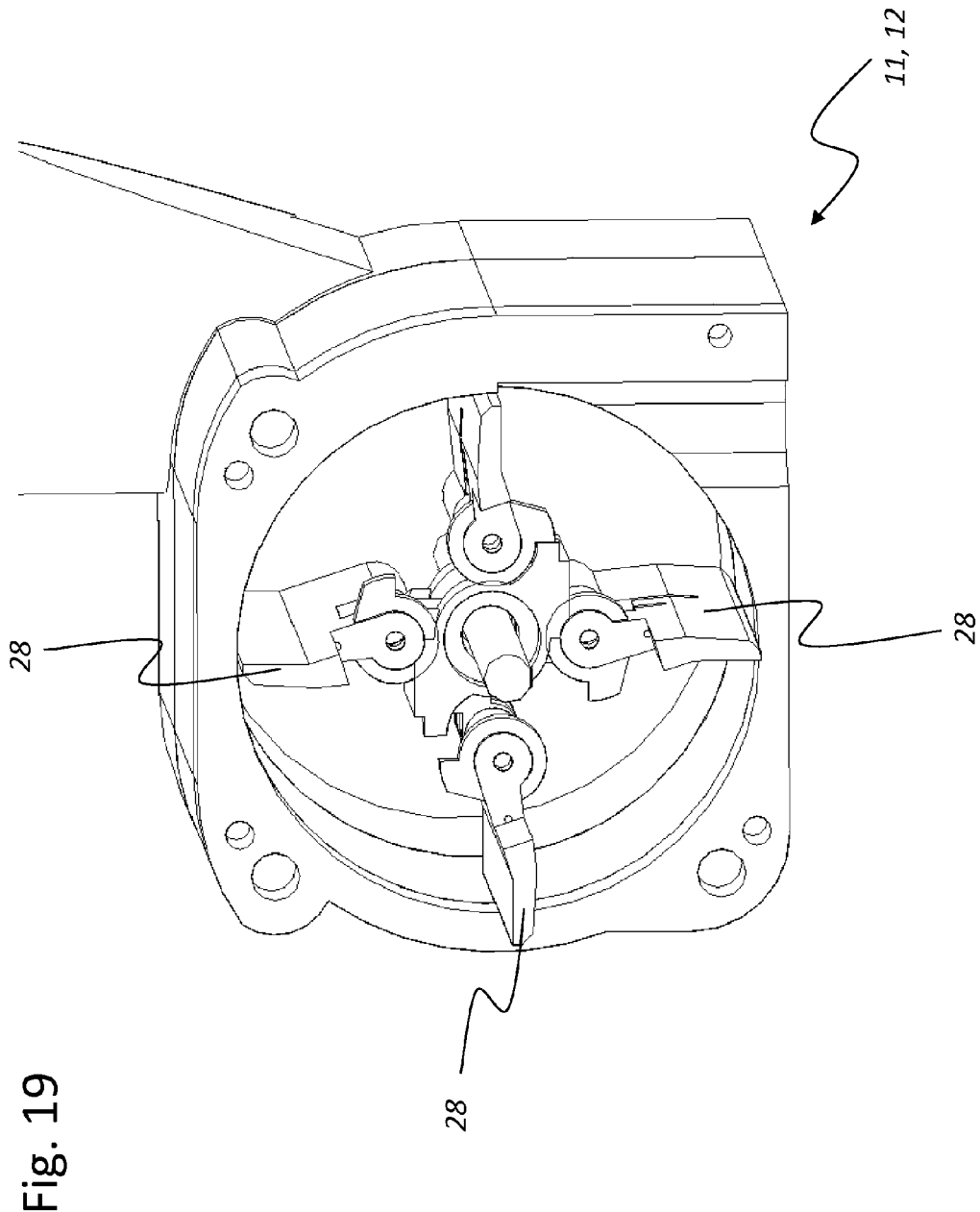

FIG. 19 shows an end view of a design variant of the distributing unit with four conveying elements arranged concentrically on a central shaft.

FIGS. 20 to 25 show different perspective views of other variants of the distributing unit.

For the same or similarly functioning elements of the invention, identical reference symbols are respectively used in FIGS. 1 to 25. Furthermore, for the sake of clarity, only those reference symbols are shown in the individual figures that are necessary for the description of the respective figure. The depicted embodiments merely constitute examples of how the device according to the invention or the method according to the invention can be structured and do not constitute conclusive limits.

Figure 2:
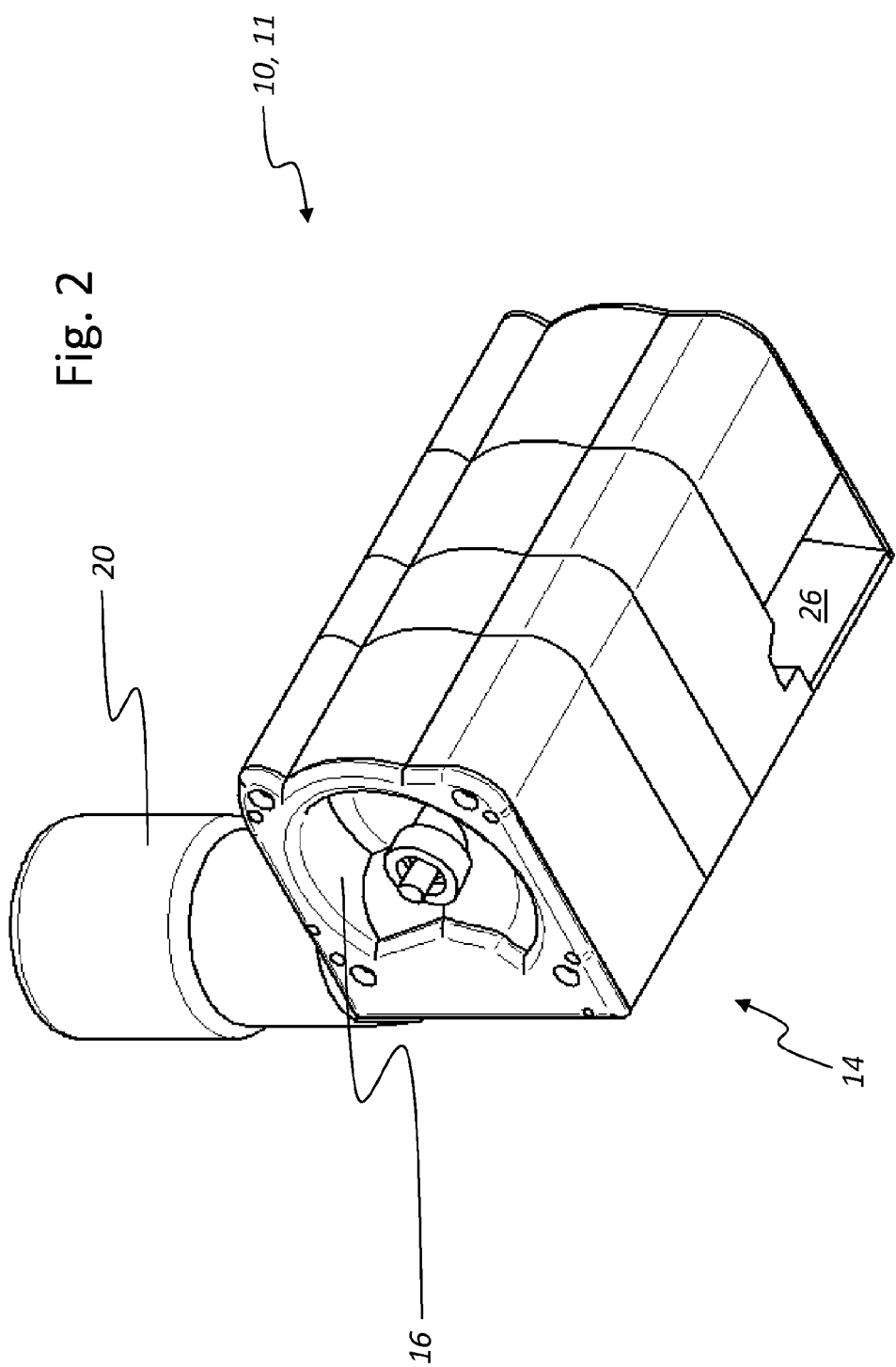
FIG. 2 shows a further perspective view of the variant of the distributing unit shown in FIG. 1 obliquely from below.

The schematic representations of FIGS. 1 and 2 each show perspective views of a first design variant of a distributing unit 10 according to the invention which is provided for the delivery of granular material in as uniform a manner as possible, ideally individually, particularly of seed grains 12, fertilizer, etc. In the depicted exemplary embodiment, the distributing unit 10 can therefore be a seeding unit 11 of a distributing machine or seed drill (not shown) in which multiple such seeding units 11 are arranged next to each other for the sowing of multiple rows. The distributing unit 10 or seeding unit 11 comprises an oblong housing 14 with a cylindrical inner circumferential surface 16 and an inlet opening 18 leading into the housing 14 for an airflow 20 with granular material or seed grains 12 transported by the airflow 20 and conveyed into the housing 14. The inlet opening 18 is a part of a connection port 22, which sits on the outside of the housing 14 and leads tangentially into it.

Figure 3:
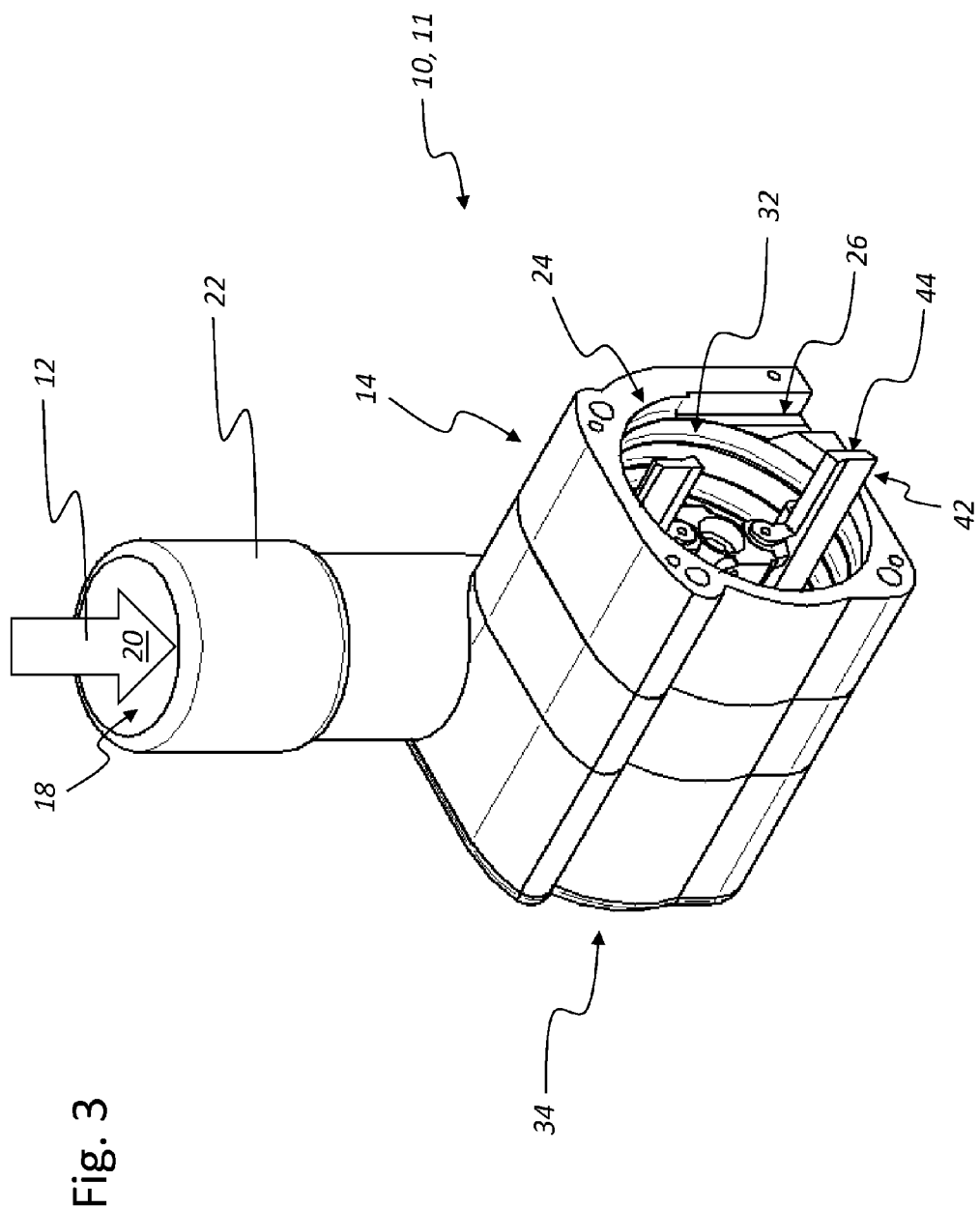
FIG. 3 shows a schematic perspective view of the distributing unit with partially opened housing and conveying device rotating therein.

As FIG. 3 et seq. show, a conveying device 24 is located in the interior of the housing 14 and supported therein and can rotate concentrically therein and serves for the transport of the granular material carried in the airflow 20 or the seed grains 12 transported by same. The airflow 20 and the rotating conveying device 24 convey the seed grains 12 to an outlet opening 26 that is approximately tangential to the inner circumferential surface 16, as can be clearly seen in FIG. 4 et seq., for example. In the depicted exemplary embodiment, the conveying device 24 has two paddle-like conveying elements 28 sweeping along the inner circumferential surface 16 that are attached opposite each other on a shaft 30 rotating concentrically in the housing 14.

As shown in FIGS. 4 to 6, the paddle-like conveying elements 28 of the conveying device 24 provide for a distribution and equalization of the flow of seed grains 12, which can initially tend to form aggregations 13 in the vicinity of the inlet opening 18 (FIGS. 5 and 6) but are ideally lined up on the conveying elements 28 as a result of the rotational movement such that the grains 12 are delivered individually and in constant intervals and with constant delivery direction through the outlet opening 26 (FIG. 4), whereby the object of the present invention—the equalizing of a flow of material for the separated delivery of grains—can be achieved to the greatest possible extent.

The perspective representation of FIG. 8 also shows an additional option of the present invention. The inner circumferential surface 16 of the housing 14 can have a structure 32 in the form of a continuous spiral, as can be seen in FIGS. 3 and 8. The spiral-shaped structure 32 extends from a first end 34, on which the connection port 22 is arranged, to the opposite end 36, on which the outlet opening 26 is located. In addition, the spiral-like structure 32 is aligned in the direction of rotation 38 of the conveying device 24 in the direction toward the outlet opening 26 and leads thereto. The spiral-like structure 32 begins in the direction of rotation 38 of the conveying device 24 (cf. FIG. 9) in the region of the inlet opening 18, thus connecting the inlet opening 18 to the outlet opening 26, so that the grains 12 carried by the airflow 20 pass through the inlet opening 18 through the connection port 22, are ordered and evened out by the conveying device 24 in conjunction with the spiral-shaped structure 32 of the walls, and finally leave the outlet opening 26 as a largely uniform flow 40 of seed grains 12. The abovementioned spiral-like structure 32 can optionally have different pitch segments and be subdivided into a deceleration and separation winding. The deceleration thread outfitted with a low thread pitch is located near the inlet 18 and at the first end 34, whereas the separation thread adjacent thereto can have a greater pitch in the direction toward the outlet 26 and to the second end 36, so that the individual thread turns have a width that corresponds approximately to the diameter of the grains 12, so that they are guided in the thread turns.

Particularly FIGS. 9 to 13 show how the uniformly rotating conveying elements 28 of the conveying device 24, in conjunction with the uniform airflow 20 running through the housing 14 and possibly the optional spiral-shaped structure 32 of the inner circumferential surface 16 of the housing 14, can bring about an equalizing of the material flow 40 (of grains, grain seeds 12, etc.) which ideally leads to an equally spaced delivery at the outlet 26. In this way, the seeding unit according to the invention provides uniform, high-quality grain separation, provided that not too many grains 12 are transported in the airflow 20 and the rotating shaft 30 does not rotate too quickly.

The illustration of FIG. 10 shows the conveyance of the grains 12 in the vicinity of the inlet opening 18 which may be disordered in part, because an optimal distribution of all of the grains relative to the respective conveying elements 28 has not yet been achieved. Some of the grains 12 are still swirled in an uncontrolled manner in the housing 14, although due to the centrifugal forces acting on the grains 12 after passing through the inlet opening 18, all of them are normally located on the inner circumferential surface 16 and move in a circular or spiral-shaped movement 48 in the direction of rotation 38 of the shaft 30. After multiple gyrations 48 and closer to the outlet opening 26, there are normally no longer any grains 12 in the housing 14 that are not positioned against and moved by the conveying elements 28 (FIG. 12), so that they are delivered from the housing 14 in an ideal tangential motion 50 as a separated flow 40 of material downward through the outlet opening 26 (FIGS. 12, 13, 14).

The separated alignment of the grains 12 on the conveying elements 28 in the vicinity of the outlet opening 26 normally ensures that, upon each pass of the end section of each conveying element 28 pointing in the direction of the second end 36, precisely one grain 12 is diverted tangentially by the ramp 52 leading tangentially away from the inner circumferential surface 16 to the outlet 26 (FIG. 13). This ramp 52 can optionally have the contour shown in FIG. 13 and provide for tangential grain movement 50 through the outlet opening 26. In principle, however, the ramp 52 can also have a different shape and have, for example, the curved profile 54 shown in FIG. 14 which, after the tangential separating motion 50, diverts the grains 12 into an axial movement 56 that runs parallel to the direction of longitudinal extension of the housing 14.

If the rotational speed of the conveying device 24 is no longer sufficient, or if the conveying device 24 comes to a standstill in the event of a fault, the design of the paddle-like conveying elements 28 provides for a sufficient open cross section in the housing interior between the inlet opening 18 and the outlet opening 26, so that a portion of the conveyed grains 12 can optionally be guided past the conveying elements 28 between the central shaft 30 and the clearance between the shaft 30 and the conveying elements 28 arranged thereon and leave the housing 14 through the outlet 26. In order to ensure this, and in order reduce the danger of blockage and hence to maintain operational safety, the longitudinal edges 42 of the paddle-like conveying elements 28 extend parallel to the direction of longitudinal extension of the housing 14 and of the shaft 30 and have a width that extends over multiple tracks or grooves of the spiral-shaped structure 32. As can be seen in FIGS. 1 to 14, the narrow ends 44 of the conveying elements 28 extending radially in the housing 14 are substantially shorter than the longitudinal edges 42 and, in the depicted exemplary embodiment, measure less than one-third of the interior diameter of the housing 14.

FIGS. 15 to 17 show a further design variant of the distributing unit 10 or of the seeding unit 11 in which the conveying elements 28 of the rotating conveying device 24 can have a slightly helical profile in the direction parallel to the shaft 30, whereby the axial advancement of the grains in the direction of the housing outlet 26 is produced. Here, the surfaces of the paddle-like conveying elements 28 are curved in the direction of their longitudinal edges 42 in such a way that a helical contour is produced in which an acute angle is formed between the direction of longitudinal extension of the housing and the surface of the conveying elements 28. This curved contour can be seen particularly well in FIG. 17. In this variant, the thread-like structure of the inner circumferential surface 16 can be omitted if necessary, since the helical contour of the conveying elements 28 provides for the axial advancement of the grains. An edge protruding radially inward over the inner circumferential surface 16 forms an axial advancement limit or guide, as can be seen in FIG. 15, for example (left grain stop), so that only the respective first lined-up grain leaves the metering unit. The slight axial advancement can also be achieved through the airflow and/or the constant supply of grains and the resulting slight inherent crowding. As will readily be understood, combinations of helical conveying elements and thread-like structures of differing shape and depth are also possible and expedient.

FIGS. 18*a* and 18*b* show different alternative design variants of the conveying elements 28 which can be shaped and sized differently depending on the material to be separated. For instance, the conveying element 28*a* shown in FIG. 18*a*, for example, is especially well suited to the separation of grains of wheat, whereas the conveying element 28*b* illustrated next to it can be used for rapeseed. The other variants 28*c*, 28*d* and 28*e* can be used for soy beans or similarly shaped grains, for example.

Figure 18:
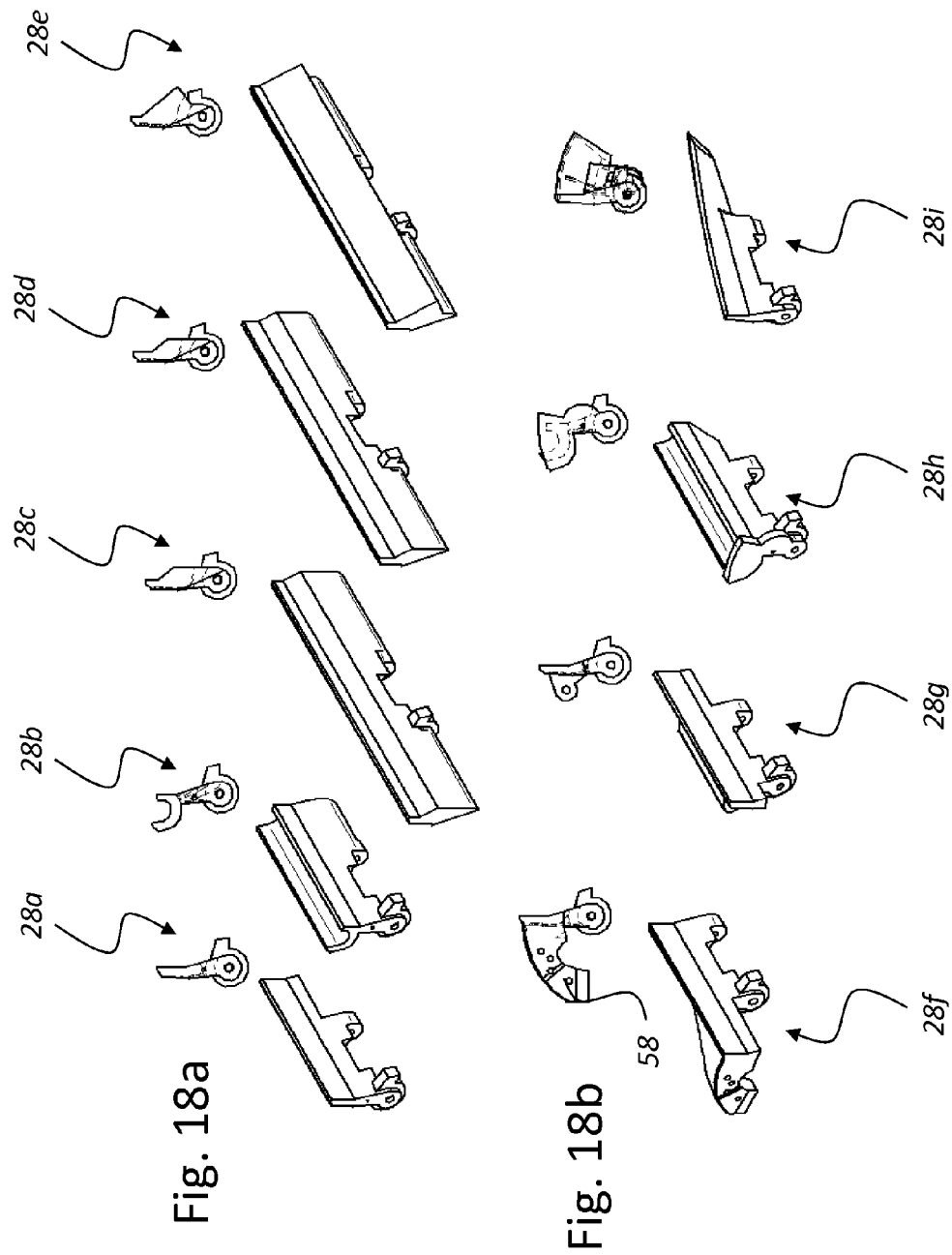

The variants of the conveying elements 28 shown in FIG. 18 are each provided with counterweights 58, so that spring elements in the region of the swivel mount of the conveying elements 28 on the shaft 30 can be omitted if necessary. In fact, the integrally formed counterweights 58 can provide for the radial alignment of the conveying elements 28 during rapid rotation of the shaft 30, while the conveying elements can easily give way and/or fold over against the direction of advancement in the event of an obstruction or resistance. For example, in the variant according to FIG. 18*b*, the conveying element 28*f* can be used for wheat, while variant 28*h* can be suitable for rapeseed, for example. Variant 28*i* exhibits a helical profile as shown in FIGS. 15 to 17.

As can be seen in FIGS. 1 to 17, the rotating conveying device 24 can have two opposing conveying elements 28 that are anchored on the shaft 30 by means of a suitable attachment. Variants are also possible, however, in which only one conveying element 28 rotates (FIG. 20) or in which three, four or more similarly or differently shaped paddle-like conveying elements 28 are provided, each of which is arranged at a uniform distance from the others on the central shaft 30. For example, the variant shown in FIG. 19 has four conveying elements 28, each being arranged at a 90° angle with respect to each other and uniformly distributed on the shaft 30.

Figure 20:
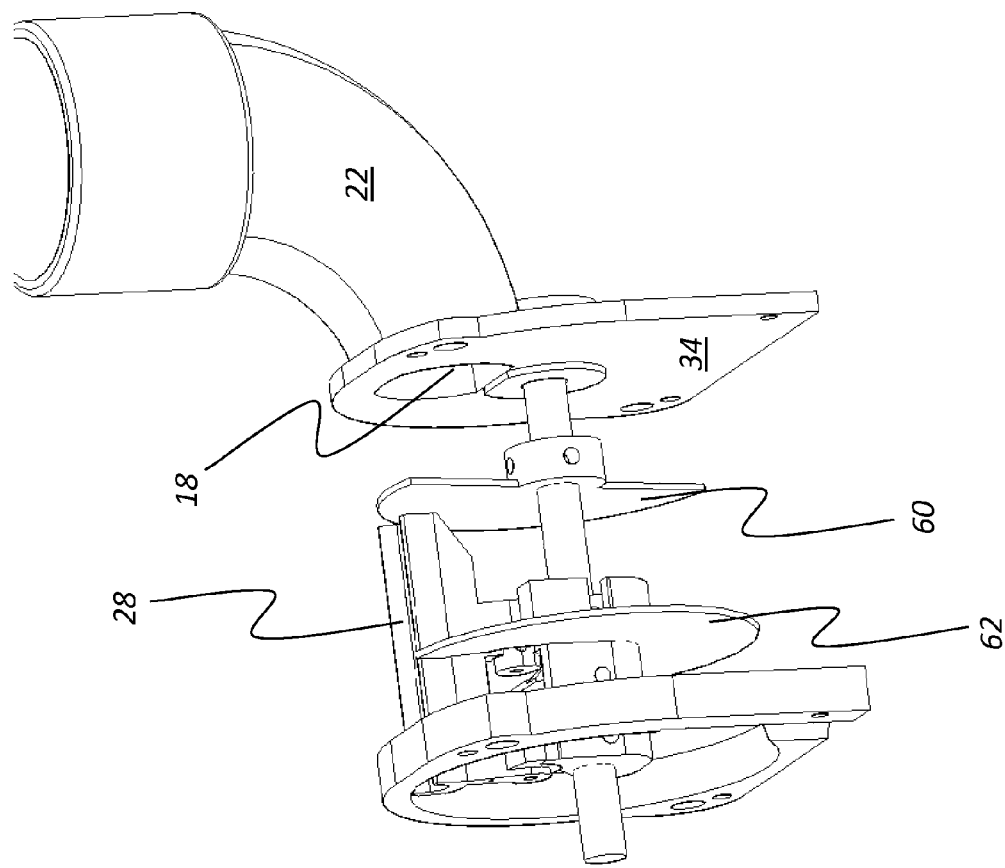
Figure 21:
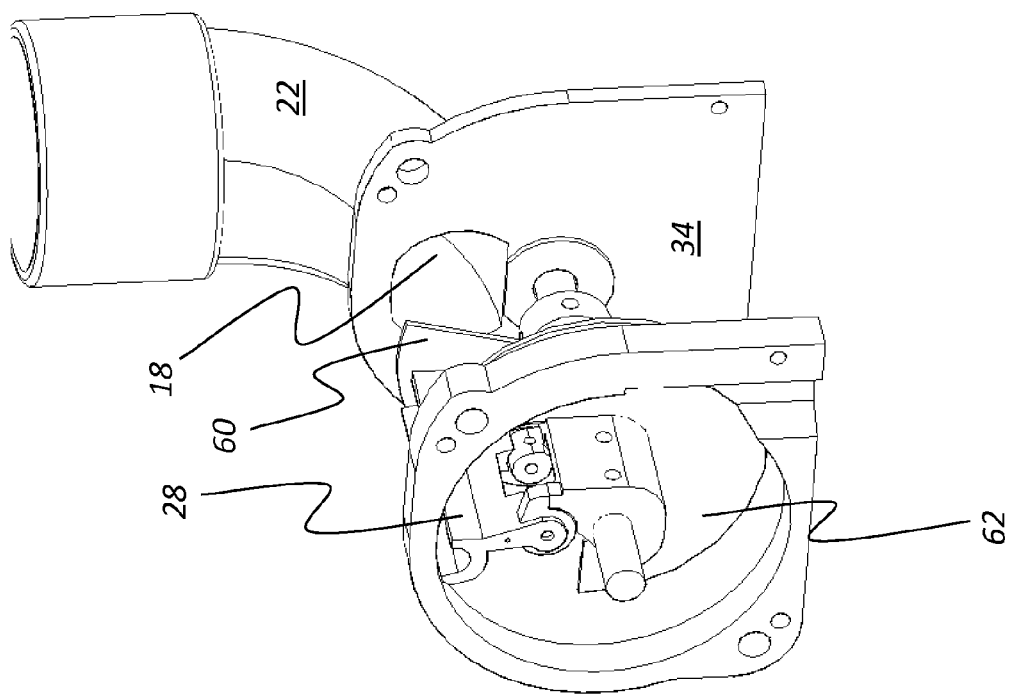
Figure 22:
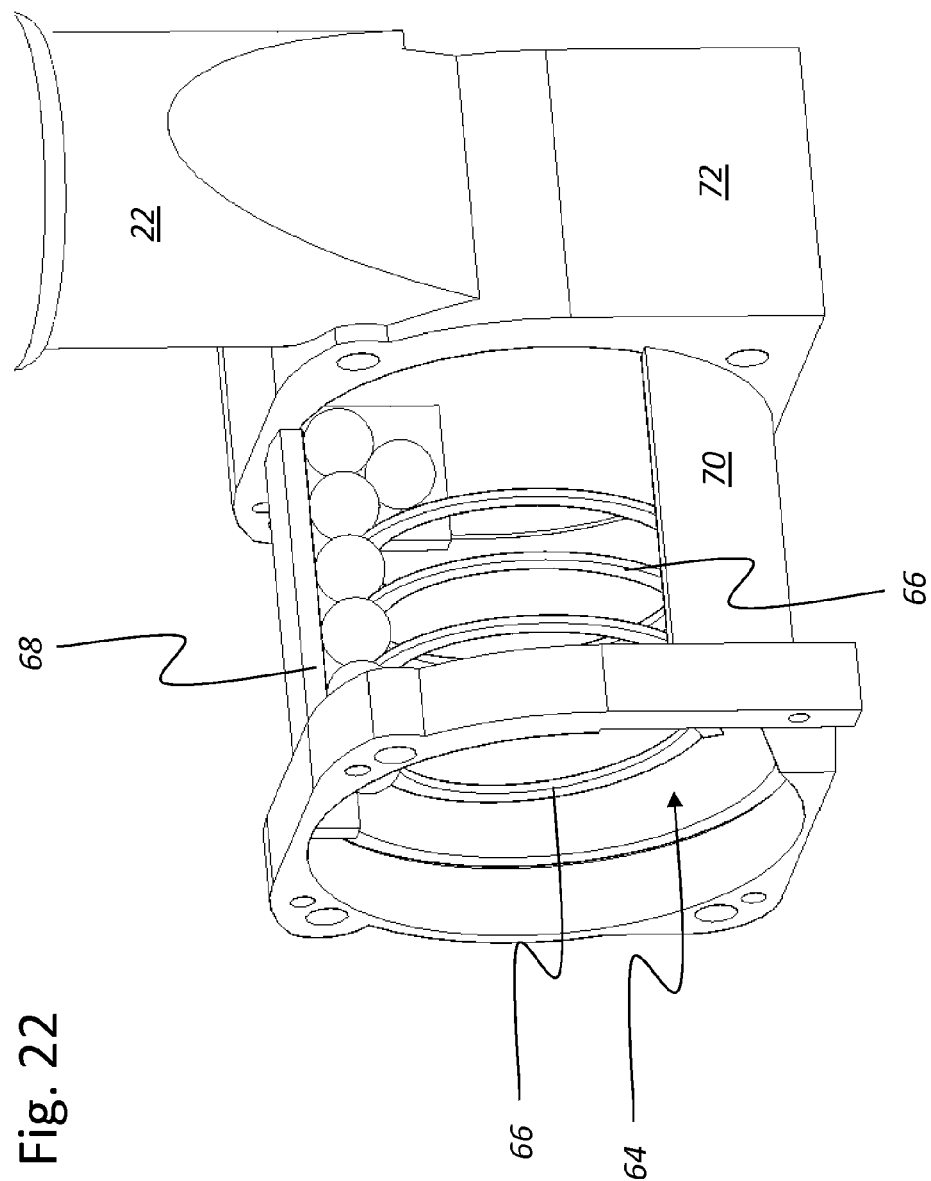
Figure 23:
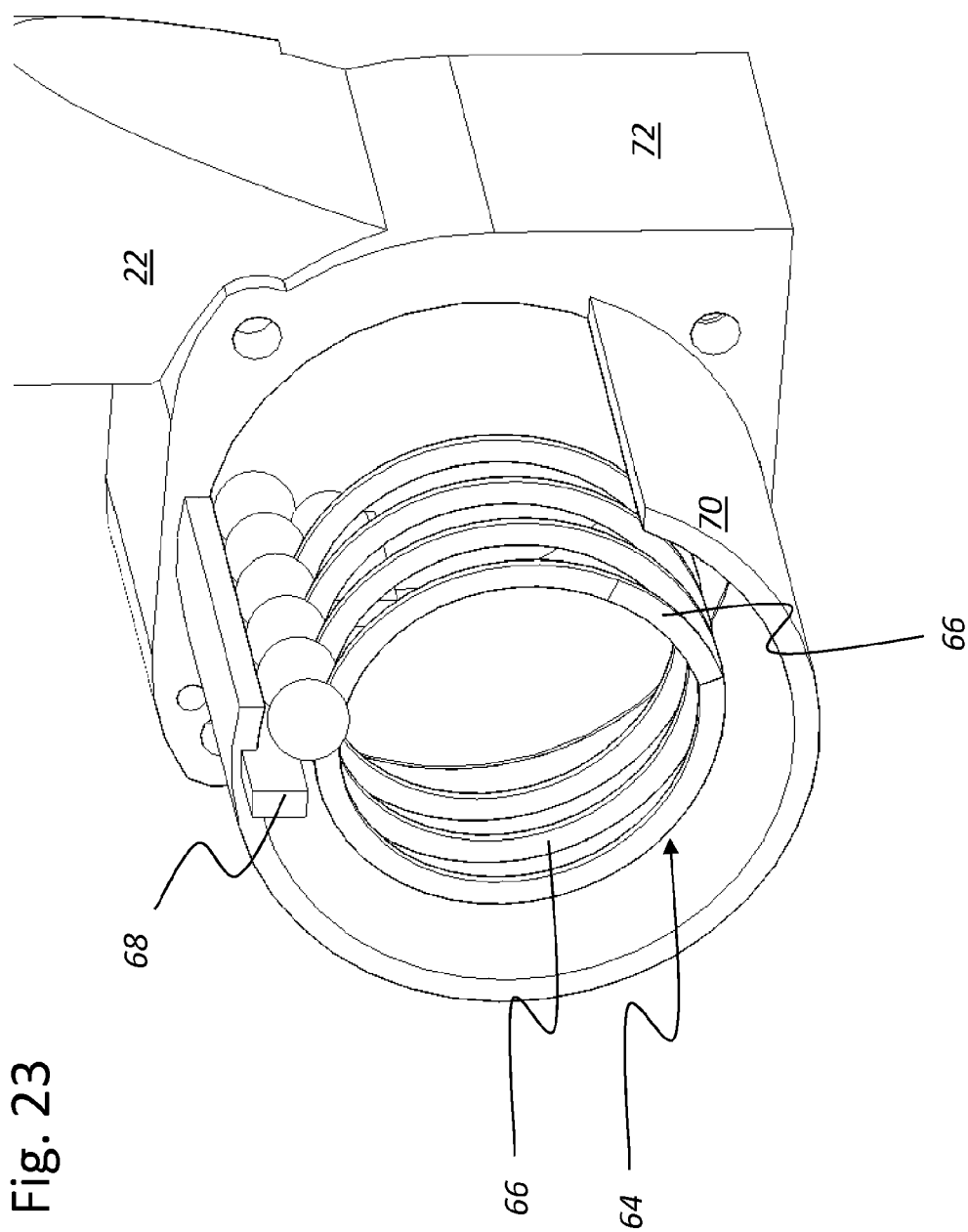
Figure 24:
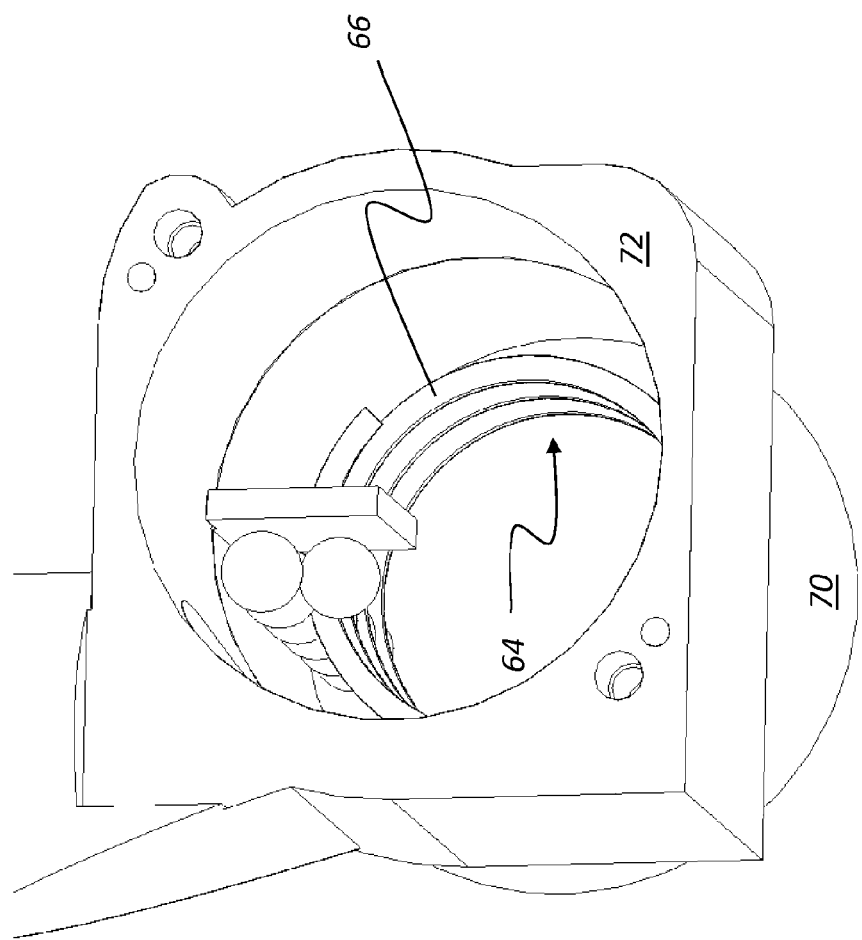
Figure 25:
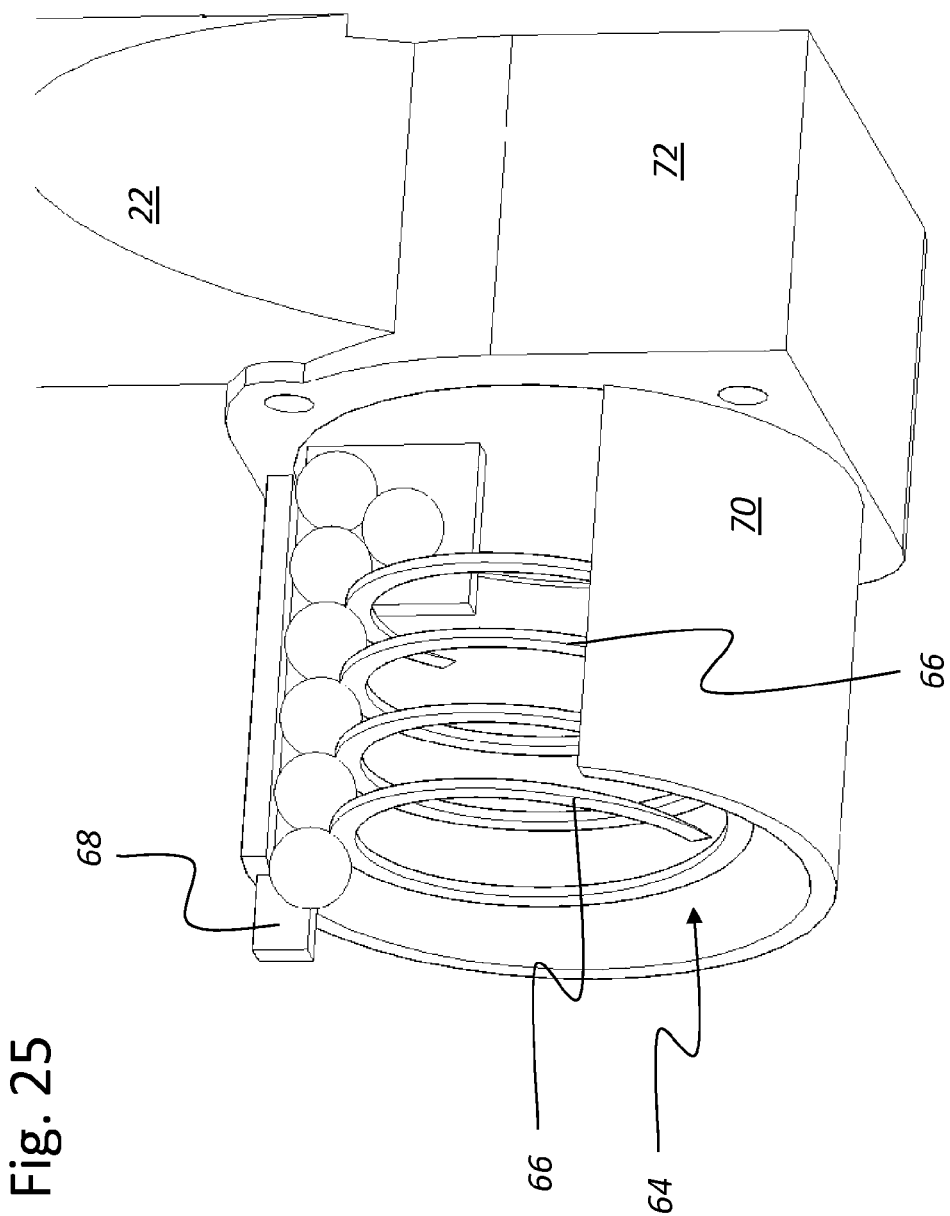

The variant shown in FIGS. 20 and 21 with only one conveying element 28 or 28*h*, which can be structured according to FIG. 18*b*, can be used, for example, for separating rapeseed. Moreover, the conveying element 28 shown there can cooperate with semicircular discs 60 and 62 that prevent the small rapeseed grains from flowing directly through the housing 14. The very small rapeseed grains are thus decelerated on the discs 60 and 62 embodied as baffle discs and prevented from penetrating to the outlet 26 in an uncontrolled manner. One of the semicircular discs 60 rotating with the shaft 30 can thus be arranged between the inlet opening 18 leading axially to the first end 34 of the housing 14 and the conveying element 28 rotating at a distance from the first end 34, while a second disc 62 can be arranged in the vicinity of the outlet opening 26 located in the second end 36. While the first disc 60 covers a circular segment of about 180° in the depicted exemplary embodiment, the second disc 62 can cover a circular segment of 270°, for example, so that the rapeseed grains located in the housing 14 are effectively prevented from reaching the outlet prematurely before they are discharged there individually.

In order to prevent blockage, the paddle-like conveying elements 28 can each be resiliently suspended on the central shaft 30, so that they can give way under increased resistance. FIGS. 4 to 12 and FIGS. 16, 17 and 19 show commensurate swivel mechanisms 46 which preferably permit a swiveling motion of the conveying elements by a defined swivel angle as soon as they are blocked by too many grains, or by foreign substances such as stones, wood, or the like. Damage is prevented in this way. As already mentioned in relation to FIG. 18*b*, counterweights 58 can also be provided on the shaft 30 instead of the resilient suspension in order to provide for the alignment of the conveying elements 28 and for their evasive movements.

The paddle-like surface of each conveying element 28 can have a contour, for example a bend or a concave curvature (cf. FIGS. 15-17). Such a contour can have an advantageous influence on the grain conveyance. In addition, it is expedient if the paddle-like conveying elements 28 each rotate with spacing from the inner circumferential surface 16 of the housing 14 that is as small as possible, as can also be seen in FIG. 3. These distances should be smaller than half of the smallest grain diameter of the material to be distributed, so that there is no threat of jamming of the grains 12 between the conveying elements 28 and the inner circumferential surface 16 of the housing 14. Furthermore, in the interest of high distribution and separation quality, the paddle-like conveying elements 28 should extend widthwise over a portion of the outlet opening 26, so that the outlet opening is swept over by the conveying elements 28 when the conveying device 24 is rotating, and the uniformly distributed material is ejected almost tangentially. Through the application of a uniform, non-pulsing airflow 20 with an approximately constant volumetric airflow and grains 12 carried along into the housing interior with the conveying device 24 rotating therein, a functioning individual grain seeding unit is made available in which the grains 12 are delivered through the outlet opening 26 individually and at uniform intervals.

The central shaft 30 of the conveying device 24, for example, can be driven by electromotive means. Optionally, the central shaft 30 of the conveying device 24 and the rotating conveying elements 28 can also be driven by an airflow 20 conducted through the inlet opening 18 into the housing 14.

FIGS. 22 to 25 show another alternative design variant of the distributing unit 10, in which a central shaft is omitted. Instead, the grains 12 are conveyed by a rotating housing section 70 with cross bar 68 and a fixed winding 66 through the housing 14 in the axial direction to the grain outlet or to the outlet opening 26. The spiral with windings of constant pitch, stationary with respect to the rotating housing section 70 and the cross bar 68, is arranged at a distance from the rotating inner circumferential surface 16 of the rotating housing section 70 and pushes the grains 12 axially to the grain outlet. The windings 66 are solidly connected to the stationary housing part 72 and/or to the stationary grain outlet 26. In this variant, the grains 12 are forced outward by the rotation-related centrifugal forces to the inner circumferential surface 16 of the rotating housing section 66. The rotating cross bar 68 provides for the advancement of the grains 12 in the direction of rotation along the circumference of the housing, while the stationary windings 66 of the non-rotating spiral 64 provide for an axial advancement in the direction from inlet 18 to outlet 26. In order to achieve this, the spacing of the spiral windings 66 from the inner circumferential surface 16 of the rotating housing section 70 must be at least slightly smaller than the smallest grain diameter, whereas the thread pitch of the windings 66 can be designed according to need. The pitch can be selected as a function of the grain size, the desired advancement in conjunction with the rotational speed of the cross bar 68, and other seeding parameters.

It does not require separate mention here that the two ends 34 and 36 of the housing 14 are normally closed. The corresponding covers are missing in some of the illustrations.

The invention has been described with reference to a preferred embodiment. However, it is conceivable for a person skilled in the art that modifications or changes can be made to the invention without leaving the scope of protection of the following claims. Particularly xxx without leaving the scope of protection of the following claims.

LIST OF REFERENCE SYMBOLS 10 distributing unit
11 seeding unit
12 grain, seed grain, seed grains
13 agglomeration
14 housing
16 inner circumferential surface
18 inlet opening
20 airflow
22 connection port
24 conveying device
26 outlet opening
28 conveying element, paddle-like conveying element
30 shaft
32 structure, spiral-like/-shaped structure
34 first front side
36 second front side
38 direction of rotation (shaft, conveying device)
40 separated flow of material
42 longitudinal side
44 narrow side
46 swivel mechanism
48 circular movement
50 tangential movement
52 ramp
54 curved profile
56 axial movement
58 counterweight
60 first disc
62 second disc
64 spiral
66 winding
68 cross bar
70 rotating housing section
72 stationary housing section
72 strap

The invention claimed is:

1. A distributing unit for granular material comprising a housing with at least one inlet opening for the conveyance of granular material and an outlet opening and a rotating conveying device having at least one rotating conveying element extending approximately axially to an inner circumferential surface of the housing for taking hold of a plurality of grains of the granular material, the grains being held by centrifugal forces on the inner circumferential surface of the housing are crowded together there and are aligned against each other and in a line or in a row at an angle which corresponds to an angular position between the inner circumferential surface and the conveying element, with the result that only a single grain of the granular material at the end of this alignment runs in a predefined path along the inner circumferential surface and leaves the outlet opening approximately tangentially to the inner circumferential surface; wherein the rotating conveying device has at least one radial free space between a shaft of the rotating conveying device and the conveying element through which excess grains carried along by the conveying element may pass so that an approximately linear grain alignment can be formed on the conveying element.

2. The distributing unit according to claim 1, wherein the grains aligned on the conveying element or along the inner circumferential surface are advanced in a slightly directed manner in a direction in order to reliably occupy the position of the respective grain being discharged.

3. The distributing unit according to claim 1, in which an airflow is conducted through the inlet opening which conveys the granular material, wherein the airflow with which the grains of the granular material are advanced moves through the housing and carries the grains to the outlet opening.

4. The distributing unit according to claim 1, wherein each conveyed grain, before being discharged through the outlet opening, undergoes a circular motion that covers an angle of at least 360 degrees, wherein each conveyed grain is held by the at least one conveying element on the inner circumferential surface which is approximately cylindrical while simultaneously experiencing a slight axial advancement in the direction toward the outlet opening.

5. The distributing unit according to claim 1, further comprising a spiral guide in at least a region of the outlet opening, the spiral guide determining the path of advancement of the grains at least in the region of the outlet opening.

6. A distributing unit for granular material comprising a housing with at least one inlet opening for the conveyance of granular material and an outlet opening and a rotating conveying device having at least one rotating conveying element extending approximately axially to an inner circumferential surface of the housing for taking hold of a plurality of grains of the granular material, the grains being held by centrifugal forces on the inner circumferential surface of the housing are crowded together there and are aligned against each other and in a line or in a row at an angle which corresponds to an angular position between the inner circumferential surface and the conveying element, with the result that only a single grain of the granular material at the end of this alignment runs in a predefined path along the inner circumferential surface and leaves the outlet opening approximately tangentially to the inner circumferential surface; wherein the at least one conveying element comprises a paddle sweeping along the inner circumferential surface.

7. The distributing unit according to claim 6, wherein a longitudinal edge of the at least one paddle extends nearly parallel to a longitudinal axis of the housing, the at least one paddle extending widthwise over the outlet opening, so that the paddle sweeps over the outlet opening when the conveying device rotates.

8. The distributing unit according to claim 6, wherein the rotating conveying device comprises two, three or more paddles, each of which is spaced uniformly from the others and arranged on a central shaft.

9. The distributing unit according to claim 6, wherein each of the at least one conveying element are mounted resiliently on the central shaft so that each of the at least one conveying element can give way under high resistance.

10. The distributing unit according to claim 6, wherein each of the at least one conveying element of the conveying device is driven electromotively.

11. The distributing unit according to claim 6, wherein each of the at least one conveying element of the conveying device is driven by the airflow conducted through the inlet opening into the housing.

12. A distributing unit for granular material comprising a housing with at least one inlet opening for the conveyance of granular material and an outlet opening and a rotating conveying device having at least one rotating conveying element extending approximately axially to an inner circumferential surface of the housing for taking hold of a plurality of grains of the granular material, the grains being held by centrifugal forces on the inner circumferential surface of the housing are crowded together there and are aligned against each other and in a line or in a row at an angle which corresponds to an angular position between the inner circumferential surface and the conveying element, with the result that only a single grain of the granular material at the end of this alignment runs in a predefined path along the inner circumferential surface and leaves the outlet opening approximately tangentially to the inner circumferential surface; wherein the inner circumferential surface of the housing has a structure in the form of a continuous spiral extending from an inlet end to an outlet end or a partial segment thereof, the continuous spiral structure spiraling in the direction of rotation of the conveying device.

13. The distributing unit according to claim 12, wherein the continuous spiral structure has segments of respectively different pitch, the pitch toward the outlet opening being greater than in a region of the inlet opening.

14. A distributing unit for distributing granular material comprising a housing with at least one inlet opening, an outlet opening and a spiral guideway, said distributing unit further comprising at least one rotating conveying element rotating axially relative to the spiral guideway and engaging granular material held in the spiral guideway, wherein rotation of the rotating conveying element advances the granular material engaged thereby along the spiral guideway from the inlet opening toward the outlet opening.

15. The distributing unit as in claim 14 wherein the spiral guideway is formed on an inner circumferential surface of the housing and the at least one rotating conveying element comprises a paddle sweeping along the inner circumferential surface of the housing.

16. The distributing unit as in claim 15 wherein the at least one rotating conveying element comprises a plurality of paddles.

17. The distributing unit as in claim 14 wherein the spiral guideway has segments of different pitch and the pitch of an outer segment extending toward the outlet opening is greater than the pitch of an inner segment proximate the inlet opening.

18. The distributing unit as in claim 14 wherein at least one radial free space extends between the at least one rotating conveying element and a shaft of at least one rotating conveying element and through which excess grains carried along by at least one rotating conveying element may pass so that an approximately linear grain alignment can be formed on at least one rotating conveying element.

19. A distributing unit for distributing granular material comprising a housing with at least one inlet opening and an outlet opening, the distributing unit further comprising at least one paddle rotating axially relative to an inner circumferential surface of the housing and having a helical profile in a direction parallel to an axis of rotation, the at least one paddle engaging granular material held by centrifugal forces on the inner circumferential surface of the housing and advancing the granular material engaged thereby along the inner circumferential surface from the inlet opening toward the outlet opening.

20. The distributing unit as in claim 19 wherein at least one radial free space extends between the at least one paddle and a shaft of the at least one paddle and through which excess grains carried along by the at least one paddle may pass so that an approximately linear grain alignment can be formed on the at least one paddle.

* * * * *